(12) United States Patent
Fakhouri et al.

(10) Patent No.: US 8,140,523 B2
(45) Date of Patent: Mar. 20, 2012

(54) DECISION BASED SYSTEM FOR MANAGING DISTRIBUTED RESOURCES AND MODELING THE GLOBAL OPTIMIZATION PROBLEM

(75) Inventors: Sameh A. Fakhouri, New Rochelle, NY (US); William F. Jerome, Amawalk, NY (US); Krishna Kummamuru, New Delhi (IN); Vijay K. Naik, Pleasantville, NY (US); John A. Pershing, Jr., Buchanan, NY (US); Ajay Raina, Kunjwani (IN); Pradeep Varma, New Delhi (IN); Peter B. Badovinatz, Beaverton, OR (US); Vijay Kumar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 12/247,291

(22) Filed: Oct. 8, 2008

(65) Prior Publication Data

US 2009/0043809 A1 Feb. 12, 2009

Related U.S. Application Data

(62) Division of application No. 09/710,646, filed on Nov. 10, 2000, now Pat. No. 7,464,147.

(60) Provisional application No. 60/164,527, filed on Nov. 10, 1999, provisional application No. 60/197,036, filed on Apr. 13, 2000.

(51) Int. Cl.
*G06F 7/00* (2006.01)
*G06F 17/30* (2006.01)

(52) U.S. Cl. ........... 707/720; 707/737; 707/E17.005; 707/E17.055; 709/223; 709/226; 709/229

(58) Field of Classification Search .............. 707/600, 707/655, 659, 660, 720, 770, 737, E17.091, 707/E17.005, E17.055; 709/220, 223, 224, 709/225, 226, 227, 229
See application file for complete search history.

(56) References Cited

U.S. PATENT DOCUMENTS

| 5,393,581 | A | * | 2/1995 | Mares .................. 428/34.1 |
| 5,617,510 | A | | 4/1997 | Keyrouz et al. |
| 5,737,728 | A | | 4/1998 | Sisley et al. |

(Continued)

OTHER PUBLICATIONS

Songwu Lu & Vaduvur Bharghvan—"Adaptive Resource Management Algorithms for Indoor Mobile Computing Environment"—Proceeding SIGCOMM '96, Conference Proceedings on Applications, technologies, architectures and protocols for computer communications, vol. 26, issue 4, Oct. 1996 (pp. 1-12).*

(Continued)

*Primary Examiner* — Jean B Fleurantin
*Assistant Examiner* — Anh Ly
(74) *Attorney, Agent, or Firm* — Scully, Scott, Murphy & Presser, P.C.; Derek S. Jennings, Esq.

(57) ABSTRACT

A decision support system called Mounties that is designed for managing applications and resources using rule-based constraints in scalable mission-critical clustering environments. Mounties consists of four active service components: (1) a repository of resource proxy objects for modeling and manipulating the cluster configuration; (2) an event notification mechanism for monitoring and controlling interdependent and distributed resources; (3) a rule evaluation and decision processing mechanism; and (4) a global optimization service for providing decision making capabilities. The focus of this paper is on the design of the first three services that together connect and coordinate the distributed resources with the decision making component.

3 Claims, 19 Drawing Sheets

U.S. PATENT DOCUMENTS

| | | | |
|---|---|---|---|
| 5,761,506 A | 6/1998 | Angle et al. | |
| 5,867,494 A * | 2/1999 | Krishnaswamy et al. | 370/352 |
| 5,958,009 A * | 9/1999 | Friedrich et al. | 709/224 |
| 5,999,525 A * | 12/1999 | Krishnaswamy et al. | 370/352 |
| 6,026,403 A | 2/2000 | Siefert | |
| 6,044,367 A * | 3/2000 | Wolff | 707/704 |
| 6,092,065 A * | 7/2000 | Floratos et al. | 707/737 |
| 6,101,508 A * | 8/2000 | Wolff | 709/223 |
| 6,178,529 B1 * | 1/2001 | Short et al. | 709/223 |
| 6,185,601 B1 * | 2/2001 | Wolff | 709/203 |
| 6,286,005 B1 * | 9/2001 | Cannon | 707/999.1 |
| 6,449,641 B1 * | 9/2002 | Moiin et al. | 709/220 |
| 6,594,779 B1 * | 7/2003 | Chandra et al. | 714/15 |
| 6,640,238 B1 * | 10/2003 | Bowman-Amuah | 709/223 |
| 6,748,381 B1 * | 6/2004 | Chao et al. | 709/223 |
| 6,782,408 B1 * | 8/2004 | Chandra et al. | 709/224 |
| 6,978,244 B2 * | 12/2005 | Rovinelli et al. | 705/2 |
| 7,020,697 B1 * | 3/2006 | Goodman et al. | 709/223 |
| 7,020,701 B1 * | 3/2006 | Gelvin et al. | 709/224 |
| 7,464,147 B1 * | 12/2008 | Fakhouri et al. | 709/223 |
| 2005/0120131 A1 * | 6/2005 | Allen | 709/233 |
| 2006/0059253 A1 * | 3/2006 | Goodman et al. | 709/223 |

OTHER PUBLICATIONS

J. B. Kaufman—"Blocking in a Completely Shared Resource Environment with State Depedent Resource and Residency Requirements"—INFOCOM '92, May 4-8, 1992 (pp. 2224-2232).*

* cited by examiner

The Performance of the Algorithm on a Synthetic Example

1. Check all vertices and mark every low-level resource. The marked vertices form Frontier(1).
   l = 1;
2. Repeat
{
   2.1. Mark all resources not already included in some frontier.
   3.2. For every resource v,
      3.2.1 unmark v if dep (v,i) for some l contains
         some u ∉ Frontier(1) U Frontier(2) U ... U Frontier(l).
   3.3. If more than k resources are marked, unmark at random all except k
   3.4. The marked resources constitute Frontier (i+1).
   3.5. Repeat
      {
         3.5.1. For every resource v in Frontier (i+1),
            if any of the variables associated with v ($z_v$, $l_{vj}$ etc)
            are found to be fractional, define all of them to be integer variables.
         3.5.2. Solve the new ILP
      }
   Until no more fractional variable are found
4. For every variable defined as an integer variable,
   convert it into a fixed value equal to its current value.
5. i = i+1;
}
Until every vertex has been included in some frontier.

FIG. 6

CPU Time in Seconds
Performance of the Method

DECISION BASED SYSTEM FOR MANAGING DISTRIBUTED RESOURCES AND MODELING THE GLOBAL OPTIMIZATION PROBLEM

CROSS REFERENCE TO RELATED APPLICATIONS

The present application is a divisional application of application Ser. No. 09/710,646, filed Nov. 10, 2000, now U.S. Pat. No. 7,464,147, the disclosure of which is herein incorporated by reference in its entirety. This application claims priority from U.S. Provisional Application No. 60/164,527, filed Nov. 10, 1999, and from U.S. Provisional Application No. 60/197,036, filed Apr. 13, 2000.

BACKGROUND OF THE INVENTION

1. Field of the Invention

This invention generally relates to decision support systems. More specifically, the invention relates to decision support systems designed for managing applications and resources using rule-based constraints in scalable mission-critical clustering environments.

2. Prior Art

A cluster is a collection of resources (such as nodes, disks, adapters, databases, etc.) that collectively provide scalable services to end users and to their applications while maintaining a consistent, uniform, and single system view of the cluster services. By design, a cluster is supposed to provide a single point of control for cluster administrators and at the same time it is supposed to facilitate addition, removal, or replacement of individual resources without significantly affecting the services provided by the entire system. On one side, a cluster has a set of distributed, heterogeneous physical resources and, on the other side, it projects a seamless set of services that are supposed to have a look and feel (in terms of scheduling, fault tolerance, etc.) of services provided by a single large virtual resource. Obviously, this implies some form of continuous coordination and mapping of the physical distributed resources and their services onto a set of virtual resources and their services.

Typically, such coordination and mappings are handled by the resource management facilities, with the bulk of the work done manually by the cluster administrators. Despite the advances in distributed operating systems and middleware technology, the cluster management is highly human administrator bound (and hence expensive, error-prone, and non scalable beyond a certain cluster size). Primary reasons for such a state-of-the-art is that existing resource management systems adopt a static resource-centric view where the physical resources in the cluster are considered to be static entities, that are either available or not available and are managed using predetermined strategies.

These strategies are applied to provide reliable system-wide services, in the presence of highly dynamic conditions such as variable load, faults, application failures, and so on. The coordination and mapping using such an approach is too complex and tedious to make it amenable to any form of automation.

Application management middleware has traditionally been used for products that provide high availability such as IBM's HA/CMP and Microsoft's Cluster Services (MSCS). HA/CMP's application management requires cluster resource configuration. Custom recovery scripts that are programmed separately for each cluster installation are needed. Making changes to the recovery scheme or to basic set of resource in the cluster requires these scripts to be re-programmed. Finally, HA/CMP recovery programs are stored and executed synchronously on all nodes of the cluster. MSCS provides a GUI-driven application manager across a two-node cluster with a single shared resource: a shared disk [see, M. Sportack, Windows NT Clustering BluePrints, SAMS Publishing, Indianapolis, Ind. 46290, 1997].

These two nodes are configured as a primary node and a backup node; the backup node is used normally pure backup node and no service-oriented processing is performed on it. Configuration and resource management is simplified with MSCS: there is only one resource to manage with limited management capabilities.

Tivoli offers an Application Management Specification (AMS) mechanism, which provides an ability to define and configure applications using the Tivoli Application Response Measurement (ARM) API layer [Tivoli Corp., Tivoli and Application Management, http:/www: tivoli.com/products/documents/whitepapers/body.map.wp.html, 1999. These applications are referred to as instrumented applications. The information gathered from the instrumented applications can be used to drive scripts by channeling the information through the Tivoli Event Console (TEC). The TEC can be configured to respond to specific application notification and initiate subsequent actions upon application feedback. The current version of ARM application monitoring is from a single system's perspective. Future versions may include correlating events among multiple systems.

Over the last few years several new efforts towards coordinating and managing services provided by heterogeneous set of resources in dynamically changing environments. The examples of these include TSpaces [see, P. Wyckoff, S. McLaughry, T. Lehman, and D. Ford, T Spaces, IBM Systems Journal, pp. 454-474, vol. 37, 1998] and the Jini Technology [see, K. Edwards, Core JINI, The Sun Microsystems Press Java Series, 1999]. The TSpaces technology provides messaging and database style repository services that can be used by other higher level services to manage and coordinate resources in a distributed environment. Jini, on the other hand, is a collection of services for dynamically acquiring and relinquishing services of other resources, for notifying availability of services, and for providing a uniform means for interacting among a heterogeneous set of resources.

SUMMARY OF THE INVENTION

An object of this invention is to provide an improved decision support system.

Another object of the present invention is to provide a decision support system that is designed for managing applications and resources using rule-based constraints in scalable mission-critical clustering environments.

A further object of this invention is to provide a decision support system in which resources are considered as services whose availability and quality-of-service depends on the availability and the quality-of-services provided by one or more other services in a cluster of resources.

To achieve the above objectives, and to overcome the above-discussed difficulties of the prior art, the present invention take an approach that is different from the traditional resource management approach. In this approach, resources are considered as services whose availability and quality-of-service depends on the availability and the quality-of-service provided by one or more other services in the cluster. For this reason, the cluster and its resources may be represented by two dimensions. The first dimension captures the semi-static nature of each resource; e.g., the type and quality of the supporting services needed to enable its services. Typically, these requirements are defined (explicitly or implicitly) by the designers of the resource or the application. These may be further qualified by the cluster administrators. These are formalized as simple rules that can be dynamically and programatically evaluated, taking into account the current state of the cluster. The second dimension is the dynamic state of the various services provided by the cluster. The dynamic changes are captured by events. Finally, all the coordination and mapping is done at a logically centralized place, where the events are funneled in and the rules are evaluated. This helps in isolating and localizing all the heterogeneity and associated complexity. By separating the dynamic part (the events) from the semi-static parts (the rules), and combining these in a systematic manner only when needed, the desired level of automation in the coordination and mapping of resources and services can be achieved.

While the general principles outlined above are fairly straightforward, there is a nontrivial amount of complexity in managing the choreography. To show the proof of concept, we have designed and implemented a system called Mounties based on the above described general principles. The Mounties architecture itself is composed of multiple components, a primary component being the modeling and decision making engine. The remaining components together form an active and efficient resource management layer between the actual cluster resources and the decision-making component. This layer continuously transports the state information to the decision maker and commands from the decision maker to the cluster resources, back-and-forth in a fault-tolerant manner.

In one embodiment, the invention provides a method to automatically build and incrementally manipulate an object database of resources from a discovered set of resources and their dependencies such that the database mirrors, digests, virtually centralises, partitions, and optimises a summary the cluster state, and ensures atomicity of changes, and enables linearisable views of the cluster with benefits.

In one embodiment, the invention provides apparatus to automatically build and incrementally manipulate an object database of resources from a discovered set of resources and their dependencies such that the database mirrors, digests, (virtually) centralises, partitions, and optimises a summary the cluster state, and ensures atomicity of changes, and enables linearisable views of the cluster with benefits like a quick clubbing of multiple events and updates.

In one embodiment, the invention provides a program storage device readable by machine, tangibly embodying a program of instructions executable by the machine to perform method steps for assisting a decision support system, said method steps comprising automatically building and incrementally manipulating an object database of resources from a discovered set of resources and their dependencies such the database mirrors, digests, virtually centralises, partitions, and optimises a summary the cluster state, and ensures atomicity of changes, and enables linearisable views of the cluster with benefits.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 6 outlines an approach to finding an optimum solution for managing online resources.

DETAILED DESCRIPTION OF THE PREFERRED EMBODIMENTS

Definitions and Basic Cluster Concepts

Figure 1:
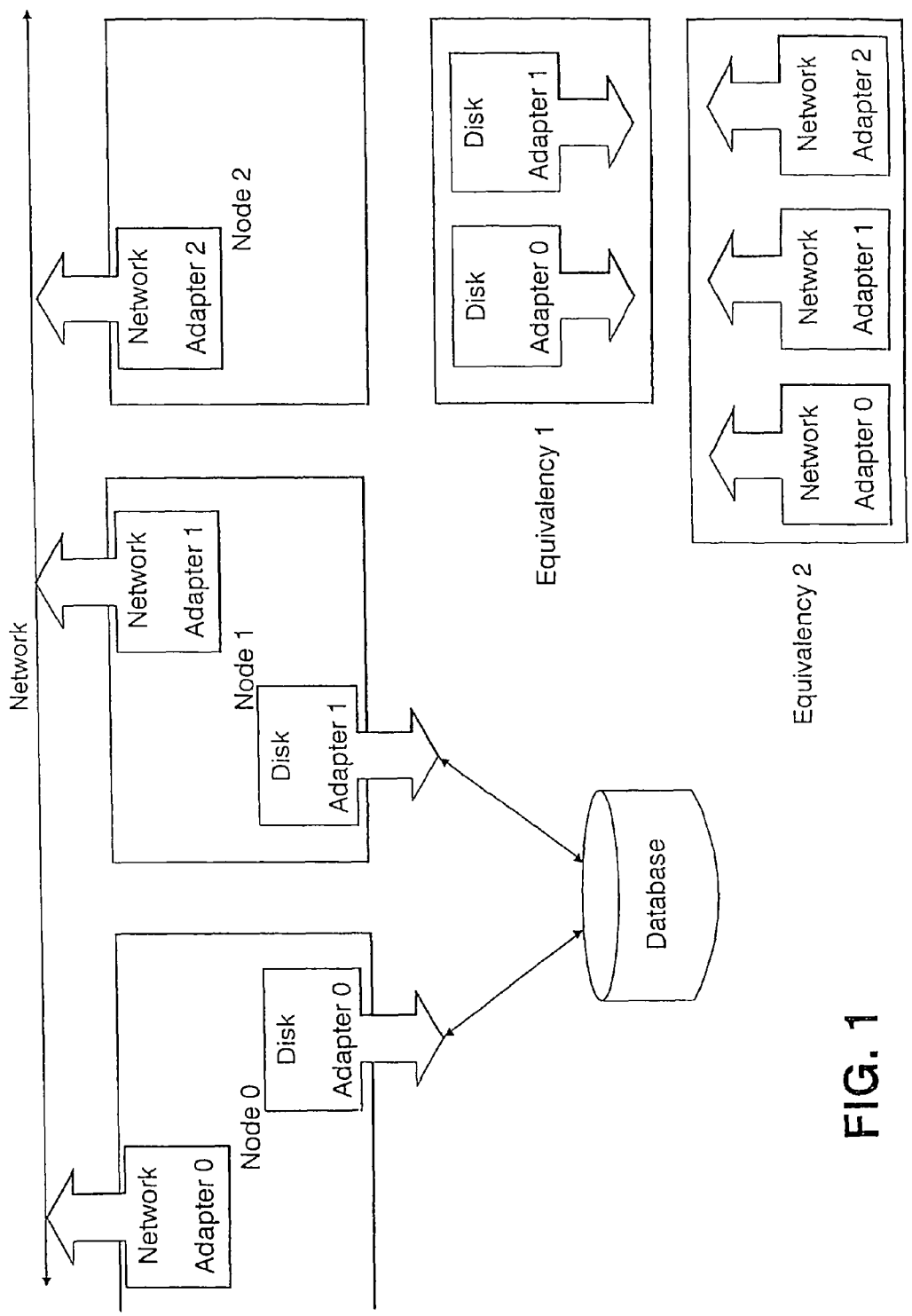
FIG. 1 shows a cluster configuration that may be managed by the present invention

In a cluster managed by Mounties, hardware components such as nodes, adapters, memory, disks, and software components such as applications, database servers, web servers are all treated as cluster resources. When there is no ambiguity, we use the terms resource and the service it provides, interchangeably. A location is a unique place in the cluster where a resource or service physically resides and makes its service available. Typically it is identified by the node (or the processing element), but it could be any uniquely identifiable location (such as an URL). To provide its intended services, a resource may need services provided by one or more other resources. These are referred to as the dependencies. In addition to the dependencies, a resource may have other limitations and restrictions such as capacity (defined in the following) or location in the cluster where it can provide its services. Some of these may be because of the physical limitations of the resource, while others may be imposed by the cluster administrators. The dependencies and the specified limitations together form a set of constraints that must be satisfied for making a service available. Usually the cluster administrator satisfies these constraints by allocating appropriate resources. Typically, a cluster is expected to support multiple services. To achieve this, constraints for multiple resources must be satisfied simultaneously, by judiciously allocating lower level supporting resources and services. This hierarchical allocation of resources (i.e., one level of resources supporting the next level of resources) gives rise to a particular cluster configuration where dependency relations are defined among cluster resources. Note that there may be more than one possible cluster configuration to provide the same set of services. When there are only a limited number of resources or when the constraints among resources are complex, there may only be a small number of ways in which cluster can be configured to satisfy all the constraints. Determining such unique configurations is a hard problem.

Resources have attributes that distinguish them from one another.

These include Name, Type, Capacity, Priority, and State. Each resource has a unique Name and resources are classified into multiple Types based on the functionality they provide. Capacity of a resource is the number of dependent resources that it can serve simultaneously. The capacity may be inherent in the design of a resource, or it may be imposed by cluster administrators for performance or testing purposes. All allocations of a resource must ensure that its capacity constraints are not violated. Priority denotes the relative importance of a resource or a service. In Mounties, the Priority is a number (on a scale of 1 to 10, 1 being the lowest) to indicate its relative value. It is used in more than one way. For example, if two resources depend on a resource that can only support one of them, then one way to resolve the conflict is to allocate the scarce resource to the resource with higher priority.

Similarly, in a cluster there may be more than one resource of a certain type and a resource or service that depends that type of resource may have a choice in satisfying that dependency. Here priority of the supporting resources may be used to make the choice. The Priority field can also be used in stating the goals or objectives for cluster operation; e.g., resources may be allocated such that the sum of the Priorities of all services made available is maximized. The State of a resource indicates the readiness of its availability. In Mounties, the State of a resources is abstracted as ONLINE, OFFLINE, or FAILED. An ONLINE resource is ready and is available for immediate allocation, provided its capacity is not exhausted; An OFFLINE resource could be made ONLINE after its constraints are satisfied. A FAILED resource cannot be made available just by satisfying its constraints. The FAILED state is indicative of either a failure because of an error condition or unavailability because of administrative servicing requirements.

We use the term end users to mean the cluster administrators, the applications that use the cluster services, or the end users in the conventional sense. In practice, cluster administrators and high level applications tend to be the real users of the services provided by Mounties.

The Mounties Approach

As described above, Mounties introduces a constraint-based methodology for the cluster configuration, startup and recovery of applications and other higher level resources. The constraints are used to build relationships among supporting and dependent resources/services. Under this approach, the heterogeneity and nonuniformity of the physical cluster are replaced by the consistent and single-system like service views. This is further enhanced by providing higher-level abstractions that allow end users to express requirements and objectives that are tailored to a particular cluster and the organization using the cluster.

Basic Rules and Abstractions

In a cluster, certain services are expected to be normally available. In Mounties, this is expressed by means of a resource attribute called the NominalState. The NominalState acts as a constraint for one or more resources in the cluster and this information becomes a part of the cluster definition. To indicate the normal availability of the services of a resource, the NominalState of that resource is set to ONLINE. This constraint is satisfied when the State of that resource is ONLINE. Furthermore, the ONLINE NominalState implies that every effort must be made to keep that service ONLINE. Similarly, a NominalState of OFFLINE is sometimes desirable; e.g., for servicing a resource or when the cost of keeping a resource on-line all the time is too high.

When a resource or service has an ONLINE NominalState, the cluster management system needs to be informed about how the resource or service can be brought on-line. Typically, most services or applications depend on other lower level services or resources.

Mounties provides two main abstractions for expressing the inter-resource dependencies: the DependsOn relationship and the CollocatedWith relationship. Resource A DependsOn B if services of Resource B are needed for the liveliness of A. Note that a resource or an application may require services of more than one type of other resources. Generally these services may be available anywhere in the cluster. In certain cases, only the services provided by local resources can be used. To express such a location specific constraint a CollocatedWith relationship is used. For example, Resource A CollocatedWith B means Resource A must have the same location as that of B; i.e., they must reside on the same node. Note that services of B may be available at more than one location. In that case, there is a choice and a decision has to be made about the location that is to be picked. Similarly, sometimes it is desirable not to locate two resources on the same node. This is expressed by the Anti-CollocatedWith constraint.

Mounties provides a new resource abstraction called an Equivalency. Generally, an equivalency is a set of resources with similar functionality, but possibly with different performance characteristics. It has a run-time semantics of "choose one of these." Since the selection of the most appropriate resource from an equivalency depends on the cluster-state, the concept of equivalencies provides Mounties with a strong and flexible method to meet the service goals of the cluster. With this abstraction, the end-user is freed from making ad-hoc decisions and allows Mounties to choose the most appropriate resource based on the conditions at run-time. An equivalency can also be associated with a weighting function, called a policy. A policy can guide, but not force, the decision-making mechanism within Mounties towards a particular selection based on end-user preferences or advanced knowledge about the system. Since an equivalency can be treated as a resource, it maintains uniformity in specifying constraints and at the same time allows specification of multiple options that can be utilized at run-time.

Finally, Mounties provides abstractions for defining business objectives or goals of how the resources in the cluster are to be managed and configured. These objectives typically include maintaining availability of cluster services and of individual resources in a prioritized manner, allocation of resources so as to balance the load or services, or delivering a level of service within a specified range, and so on.

Management and Coordination of Resources

At the lowest levels, all resources are manipulated in a programmable manner or from the command line. Mounties divides the work such that the decision making and resource allocation processes (which require global knowledge about the cluster) are distinct from the resource monitoring, controlling, and manipulating processes (which require resource specific information) such as the resource managers. This encapsulation of resource manipulation gives flexibility and requires no special programming in order to add an application into the cluster once its resource manager is available.

Mounties gathers and maintains information about the cluster configuration and the dependency information for each resource at cluster startup or whenever a new resource or application is introduced in the cluster. A continuous event notification and heartbeat mechanisms are also needed for monitoring cluster-wide activities. Using these mechanisms, Mounties continuously monitors the cluster-wide events and compares the current cluster-state with the desired state. Whenever there are discrepancies between the two, the best possible realignment of resources is sought after taking into account the conditions existing in the cluster and the desired cluster-wide objectives. If a new realignment of resources can lead to a better configuration, commands are issued to the resources to bring about the desired changes.

These principles are illustrated in the following simple, but realistic example.

An Example

Figure 2:
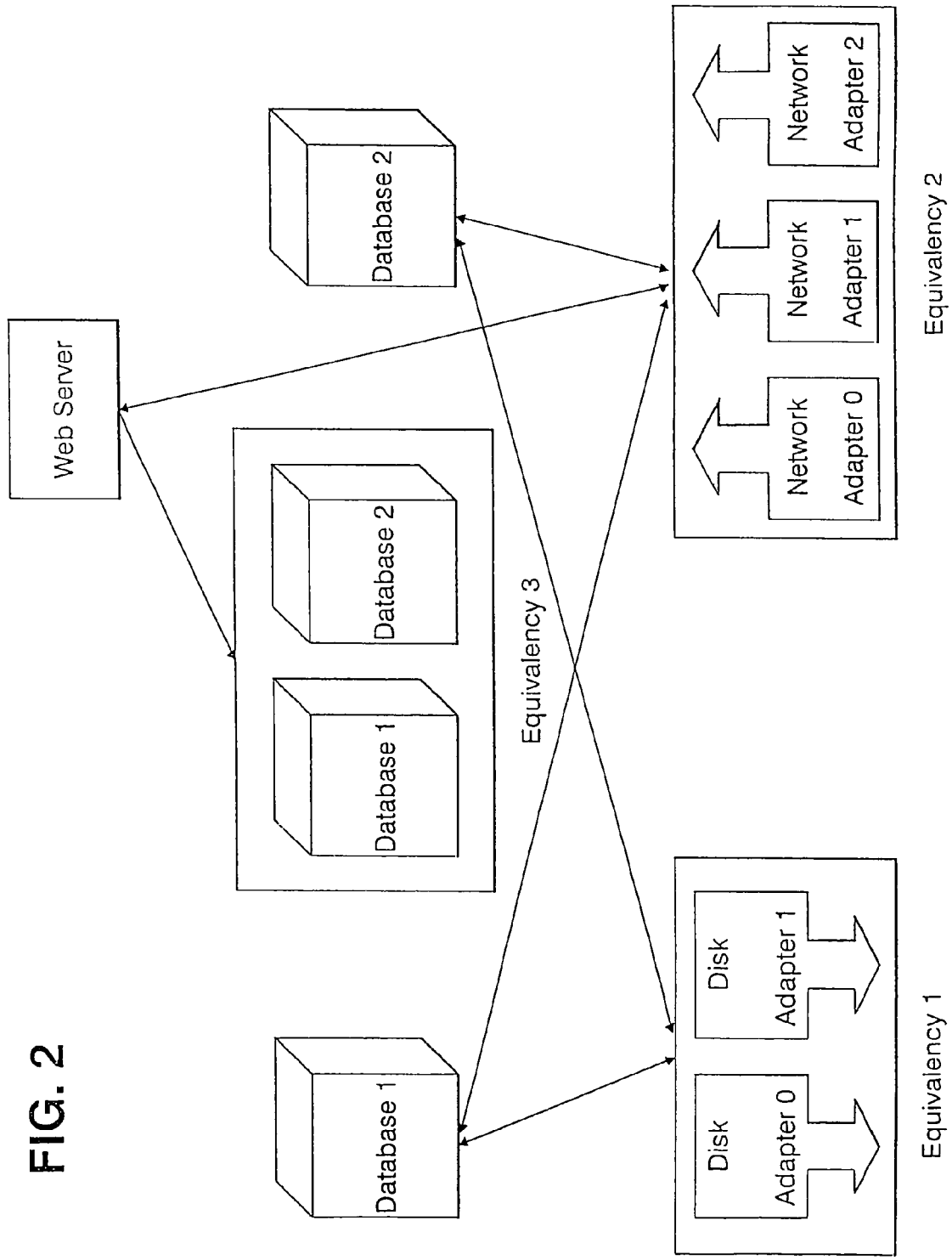
FIG. 2 illustrates the dependencies for a web server supported by the cluster configuration of FIG. 1.

This example involves a cluster of three nodes shown in FIG. 1. Both Node~0 and Node~1 have disk adapters that connect them to a shared disk which holds a database. Each node has a network adapter which connects it to the network. The services of this cluster are used by a Web Server, as shown in FIG. 2.

The hardware and software components shown the FIG. 1 are defined to Mounties along with their attributes and are treated as resources. For example, the disk adapter~0 has the following attributes:

```
Disk Adapter 0 Attributes
{
    Capacity = 1
    Priority = 2.0
}
```

The nodes and other adapters in the system are defined to Mounties in a similar manner. Using these basic resources, a set of equivalencies are defined. As explained earlier, an equivalency is a grouping of the same type of resources and is treated as an abstract resource. In this example, Equivalency 1 groups the two disk adapters into one new resource. Similarly, Equivalency 2 groups the three network adapters into one new resource.

The database itself has two engines that can be brought on-line only on the nodes with both disk and network adapters. FIG. 2 shows the dependencies for the two database management engines. Database engine 0 has the following attributes:

```
Database 0 Attributes
{
    NominalState = ONLINE
    Priority = 8.0
    DependsOn = Equivalency 1, Equivalency 2
    CollocatedWith = Equivalency 1,Equivalency 2
}
```

Database engine 1 is defined in the same manner. Aside from having a relatively high priority of 8, both engines have a NominalState of ONLINE. This indicates to Mounties that it should try an keep them both ONLINE at all times. In addition, the database engines have dependencies and collocation constraints on both Equivalency 1 and 2. Both constraints are represented in FIG. 2 by the bi-directional arrows linking the Database engines to the Equivalencies.

Mounties represents these constraints as follows: For each Database engine to be online we need a Disk Adapter, a Network Adapter and they must be located on the same node as the Database engine. So, if Mounties were to pick Disk Adapter 0 from Equivalency 1 to satisfy the requirements of Database 1 for a disk adapter, the collocation constraint will force it to also pick Network Adapter 0 from the Equivalency 2. So, to make Database 1 ONLINE, Mounties would perform the following allocations:

```
Database 1
{
    From Equivalency 1 = Disk Adapter 0
    From Equivalency 2 = Network Adapter 0
    Node Assignment = Node 0
}
```

These allocations satisfy all the constraints of Database 1, therefore it can be brought ONLINE. When allocating resources for Database 2, neither Disk Adapter~0 nor Network Adapter~0 are eligible because their capacity is exhausted. Mounties cannot allocate Network Adapter 2 from Equivalency 2, since there is no Disk Adapter on Node 2 that would satisfy the collocation constraint. The only choice then is the following allocations for Database 2:

```
Database 2
{
    From Equivalency 1 = Disk Adapter 1
    From Equivalency 2 = Network Adapter 1
    Node Assignment = Node 1
}
```

These allocations satisfy all the constraints of Database 2, therefore it can be brought ONLINE.

FIG. 2 also shows Equivalency~3, which contains both Database engines. Shown also is a new resource, Web Server which has the following attributes:

```
Web Server Attributes
{
    Nominal State = ONLINE
    Priority = 6.0
    DependsOn = Equivalency 2, Equivalency 3
    CollocatedWith = Equivalency 2
}
```

The dependency and collocation constraints are shown with the bi-directional arrows linking the Web Server to Equivalency 2. The dependency is shown with the uni-directional arrow linking the Web Server to Equivalency 3.

Given the previous assignments that Mounties made to bring the Database engines up (i.e., make their State ONLINE), the only available Network Adapter from Equivalency~2 is Network Adapter 2.

To satisfy the Web Server's dependency on Equivalency 3, Mounties could pick Database~1. So, to bring the Web Server to the ONLINE state, Mounties would perform the following allocations:

```
Web Server
{
    From Equivalency 2 = Network Adapter 2
```

-continued

```
    From Equivalency 3 = Database 1
    Node Assignment = Node 2
}
```

This completes the resource allocations necessary to bring all resources to the ONLINE state. While running, if Database 1 should fail for any reason, Mounties would switch the Web Server over to Database 2 and thus keep it ONLINE.

We note here that in the above, we have described the decision making process in an intuitive manner. In Mounties, this process is formalized by modeling the problem as an optimization problem with specific objective functions defined by cluster administrators. The optimization problem encapsulates all the relevant constraints for the cluster resources along with desired cluster objective. Good solution techniques invariably involve performing global optimization.

Mounties Design Overview

Previously, we have discussed the resource management concepts used in Mounties. We now describe the Mounties architecture and its design in some detail, and provide rationale for our design decisions where appropriate.

A cluster is a dynamically evolving system and is constantly subject to changes in its state because of the spontaneous and concurrent behavior of the cluster resources, random and unpredictable nature of the demands on the services, and the interactions with end users. At the same time, a cluster is expected to respond in a well-defined manner to events that seek to change the cluster-state. Some of these events are:

1. Individual resource related events such as: resource is currently unavailable; unavailable resource has become available; a new resource has joined the cluster; a resource has (permanently) left the cluster.
2. Feedback response to a cluster manager command: successful execution of a command such as go online or go offline; failure to execute such a command.
3. End user interactions and directives: cluster startup and shutdown; resource isolation and shutdown; manual overrides for cluster configurations; movement of individual and/or a group of resources; changes in dependency definitions and constraint definitions among resources; updates to business objectives; requests leading to what-if type of analysis, and status queries.
4. Resource groups related events, or virtual events, which arise from a combination of events/feedback related to individual resources.
5. Alerts and alarms from service and load monitors.

With these dynamic changes taking place in the background, a cluster manager such as Mounties is required to make resource allocation and other changes such that the predefined global objectives are met in the best possible manner, while resource specific constraints are obeyed. The resource specific constraints usually limit the number of ways in which the resources in the cluster can be configured. These constraints include capacity constraints, dependency constraints, location constraints, and so on. The objectives and the constraints lead to a solution of a global optimization problem that must be solved in soft real-time. This requires an efficient decision making component and a set of services that form an efficient middleware connecting the resources with the decision making component. Before describing how these components can be designed, first we describe the overall clustering environment in which a system like Mounties operates.

Cluster Infrastructure

The Mounties system as described here can be used as an application/resource management system or as a subsystem for guaranteeing high availability and quality-of-service for other components in the cluster. When used as an application/resource management system, the Mounties system described here can basically be used in a stand-alone mode. When used as a guarantor of dependable services, a few other cluster services are required.

Figure 3:
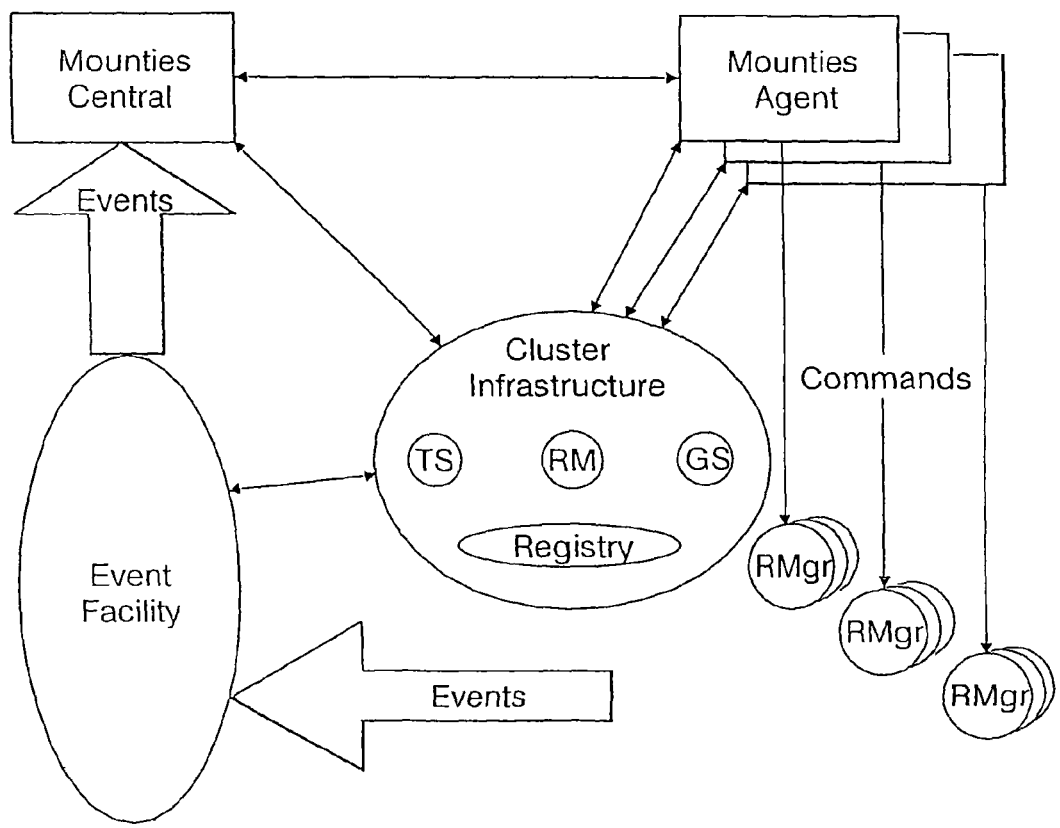
FIG. 3 depicts aspects of the present invention and their relationship cluster services.
Figure 4:
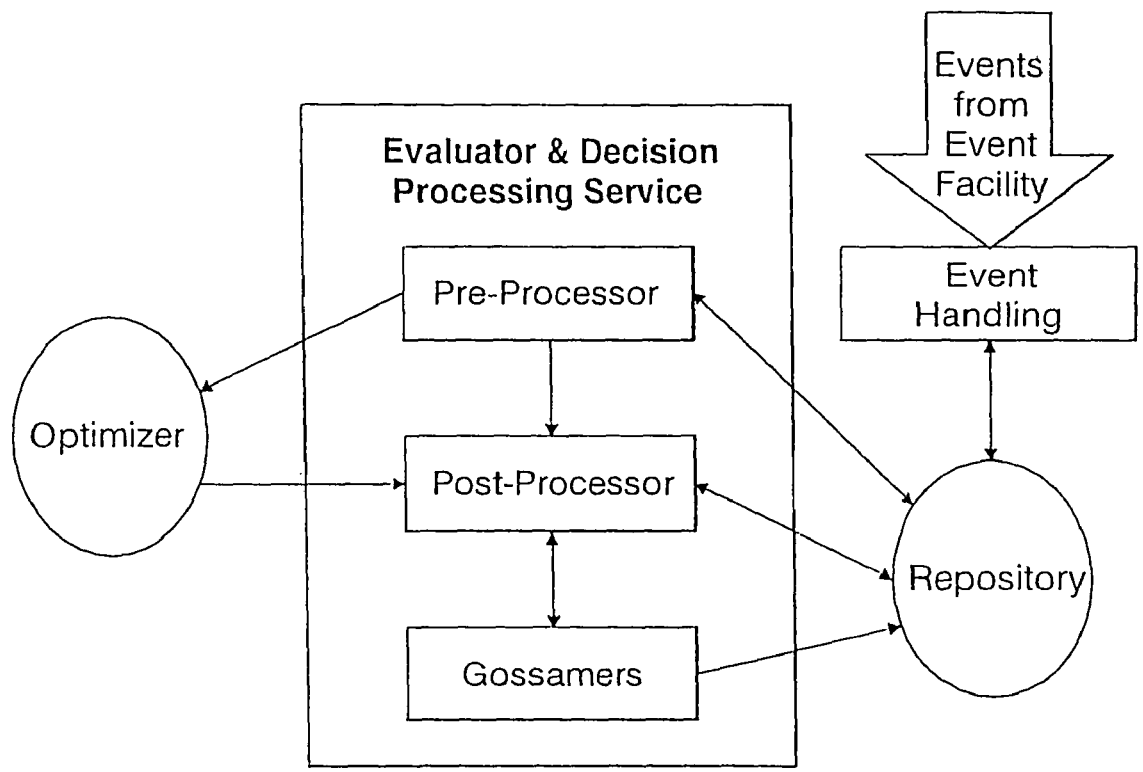
FIG. 4 shows an internal design of a preferred decision support system embodying this invention.
Figure 5:
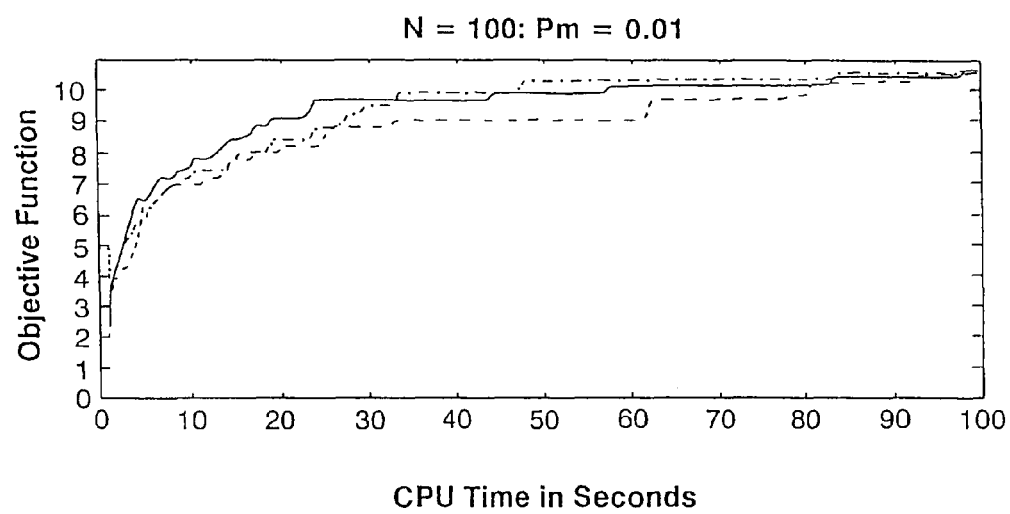
FIG. 5 shows the performance of an algorithm that may be used in the practice of this invention.

In FIG. 3, we illustrate a conceptual design of Mounties on the top of basic high availability services. Using these services, Mounties can then be used as an intelligent mechanism for guaranteeing high availability. Note that the basic cluster services that Mounties would depend on are provided as standard services in state-of-the-art clusters such as IBM's SP-2 System [see, IBM Corp., RS/6000 SP High Availability Infrastructure, IBM Publication SG24-4838, 1996; and IBM Corp., RS/6000 SP Monitoring: Keeping It Alive, IBM Publication SG24-4873, 1997]. As shown in FIG. 4, four additional cluster services are needed to ensure high availability: (1) a persistent Cluster Registry (CR) to store and retrieve the configuration of the resources; (2) a mechanism called Topology Services (TS) for detecting node and communication adapter failures; (3) a mechanism for Reliable Messaging (RM) for important communication between Mounties Central and all the other Mounties Agents; and (4) a Group Services (GS) facility for electing a-leader (i.e., Mounties Central) at cluster initialization and whenever an existing leader is unable to provide its services (because of a node failure, for example). We note here that the Mounties Repository and the Event Notification services (described below) can be embellished to incorporate the functions provided by Cluster Registry and Reliable Messaging. Similarly, a customized version of Group Services can be designed into the Mounties architecture to monitor and elect Mounties Central.

Internals of Mounties Design

Overview and the Ideal

In brief terms, designing the internals of the manager described thus far is an exercise in coming up with software that can coordinate the following choreography: Events arise asynchronously, throughout the cluster. They are delivered to the coordinator (such as an ideal version of Mounties) using pipelined communication channels. The coordinator is programmed to respond to events in the context of a semi-static definition of the cluster, that consists of dependencies, constraints, objective functions etc. The coordinator's decision-making component, basically an optimizer, has to combine the dynamic events with the semi-static definition in order to arrive at a response to events.

The response has to translate into simple commands to resources such as go ONLINE and go OFFLINE. The coordinator sends its commands to resources at the same time as when various events arise and traverse the cluster. The commands are also sent using pipelined communication channels. Thus there is a basic dichotomy in the activity of coordinating the choreography. At the one end there is the cluster of resources and the events it generates. At the other end there is the decision-making optimizer. In between the two is middleware that along one path, collects, transports, and fine-tunes events for the decision-maker, and on the reverse path, decomposes the decisions of the decision-maker into commands that are then transported to the individual cluster resources.

Ideally, the coordinator reacts to the events instantaneously. It is able to account for faults in command execution—not all commands may succeed—along with being able to respond to events and command feedback in a real-time manner. Suppose the ideal coordinator is an infinitely fast computation engine. In this case, the choreography becomes a seamless movement of events, commands, and commands feedback in a pipelined/systolic manner throughout the cluster. Events and feedback upon arrival at the coordinator get transformed instantaneously into commands that in turn get placed on channels to various resources. The coordinator is able to ensure that globally-optimal solutions get deployed in the cluster in response to cluster events.

In Mounties, the ideal coordinator as described above is approximated by one active Mounties Central that resides on one node, to which all events and command feedback get directed. Mounties Central can change or migrate in response to say node failure. However, at one time, only one Mounties Central is active.

Command Execution Model

The next definition we add in deriving our practical system from, the ideal alluded to above is a command execution model. The model builds fault tolerance and simplicity in the execution of commands by sacrificing pipelining. It uses the following protocol: A command contains all the state needed for its execution by a resource manager. A command is only a simple directive to a resource manager; e.g., "go ONLINE using X, Y, Z resources," or "go OFFLINE," and no more. A resource manager does not need a computation engine to handle conditional behavior or context evaluation at its site. To achieve this, no new command is sent out until Mounties is aware of the positive outcome of the commands that the execution of the new command depends on. It is up to Mounties Central to make the best use of the command feedback it receives in order to minimize command failure. So for example, after receiving an "go ONLINE" command, a resource manager need not find out whether its supporting resources are actually up. The resource manager should simply assume that to be the case. In general, the more effective Mounties is in managing such assumptions, more efficient is the overall resource coordination. Clearly, one of the things Mounties Central has to do is to issue the commands in the partial order given by dependencies. Thus, in order for a resource to be asked to go on-line, its planned supporting resources have to be brought up first. Only after that the resource is to be asked to go on-line using the specific supporting resources. Similarly, before bringing down a resource, all the resources dependent on that resource must be brought down first. The existing and the planned dependencies in the cluster thus enforce a dataflow or partial order on the execution of the commands.

The above command execution model imposes minimal requirements on resource managers. This allows our system to coordinate heterogeneous and variously-sourced resources without requiring unnecessary standardization on the implementation of resource managers. The command execution proceeds in a dataflow or frontier-by-frontier manner. Within a frontier, commands do not depend on one another, and thus can proceed concurrently. A preceding frontier comprises of commands whose execution results are needed for the succeeding frontier. For bringing up resources, the frontiers are arranged bottom up, from the leaves to root(s), while for bringing down resources, the order is reversed. For example, in shutting down the cluster in the above example, the first the web server has to be brought down. The next frontier comprises of the two databases and either can be brought down before the other. On the other hand, in bringing up the same cluster, the order of the frontiers is reversed and the web server is the last entity on which an up command gets executed. Note that ordering of the frontiers does not imply synchronized execution. Individual commands in a frontier are issued as soon as the corresponding commands in the preceding frontiers are executed successfully. Although commands across frontiers are not pipelined, no artificial serialization is introduced either. The system remains as asynchronous and concurrent as it can within the bounds of the commands model described above.

Realizable Decision Making

An infinitely-fast or zero-time computation engine is not realizable. Since the optimization decisions involve solution of NP-hard problems [see, R. Krishna and V. Naik, Application of Evolutionary Algorithms in Controlling Semi-autonomous Mission-Critical Distributed Systems, Proceedings of the Workshop on Frontiers in Evolutionary Algorithms, (FEA200), February 2000], even an attempt at approximating zero time, or say hard real time, for solving the optimization problem is not possible. The approach we follow embraces global heuristic solutions that can be arrived at in soft real time. The computationally intensive nature of the decision making component predisposes us towards persisting with a previously derived global solution even when there are a limited number of command failures. It is not computationally-efficient to chart a totally new global course every time there is a command failure. So for example, when a resource refuses to go ONLINE, Mounties looks for an auxiliary solution from within the proposed solution that can substitute for the failed resource. For example, a lightly-loaded resource can (and does) replace a failed resource in case the two belong to the same equivalency. Auxiliary solutions are local in nature. If the finally deployed solution turns out to have too many auxiliary solutions, then the quality of the solution is expected to suffer. To avoid the configuration to deviate too far from the globally optimal solution, Mounties recomputes a global solution whenever the objective value of the deployed solution is below a certain value as compared to the proposed solution. This is done by feeding back an artificially-generated event that forces recomputing the global solution. In summary, Mounties does not attempt to maintain a globally-optimal cluster configuration at all times. Instead, Mounties looks for global approximations for the same. The obvious tradeoff here is using a suboptimal solution versus keeping one or more cluster services unavailable while the optimal solution is being computed. The tradeoff could be unfavorable for Mounties in a relatively uneventful and simple clusters where the resources take relatively long time to execute "go ONLINE" and "go OFFLINE" commands as compared to the time spent in determining optimal solution. For such clusters, it would be of merit to recompute a globally optimal cluster configuration.

Computing a globally optimal solution based on the constraints and the current state of cluster, is a significant function of Mounties. The resulting optimization problem can be cast as an abstract optimization problem that can be solved using many well known techniques such as combinatorial optimization methods, mathematical programming and genetic/evolutionary methods. For that reason and to bring modularity to the design, in Mounties, we treat that as a separate module and it is called the Global Optimizer or simply, the Optimizer. It is designed with a purely functional interface to the rest of the system. The interface to the Optimizer module completely isolates it from effects of concurrent cluster events on its input. A snapshot of the current cluster-state, which incorporates all events that have been recorded till the time of the snapshot, is created and handed over to the Optimizer. The metaphor snapshot is meaningful since once taken, the snapshot does not change even if new events occur in the cluster. The snapshot is thus referentially transparent, i.e., purely functional and non-imperative, and references to a particular snapshot return the same data time after time. Given a snapshot, the Optimizer proceeds with its work of proposing an approximately optimal cluster configuration that takes into account the current context and the long-term objectives defined for the cluster.

Just as the Optimizer is not invoked whenever a new cluster event arrives, it may not be interrupted if a new event arrives while I is computing a new global solution. This is primarily to maintain simplicity in the design and implementation. Thus, when the Optimizer returns a solution, the state of the cluster, as perceived by Mounties, may not be the same as the state at the time the optimizer is invoked and that the results produced may be stale. Our system however does try to make up for exclusion of newer events by aligning the solutions proposed by the optimizer with any events that may have arrived during the time the solutions were being created. Such an alignment however, is local in nature. Over longer time intervals, the effects of newer events get reflected in the global solutions computed subsequently.

Because of the nature of the problem, simple rule-based heuristics can be used to make local optimization decisions prior to invoking the Optimizer. Such preprocessing can significantly reduce the turnaround time in responding to events. The preprocessing step is also necessary for isolating the Optimizer from the on going changes in the system. This referred to as the Preprocessor. Specifically the Preprocessor waits on a queue of incoming events and then processes an eligible event all by itself or hands down a preprocessed version of the problem to the Optimizer. The decisions from the Optimizer or the Preprocessor are directed to a module called the Postprocessor, which is the center of the command generation and execution machinery. FIG. 4 shows the interactions among the Preprocessor, the Optimizer, the Postprocessor, and other modules. These modules are discussed in detail next.

Main Services

As discussed in the subsection on repository herein, each resource managed by Mounties is represented in the centralized repository by an object for the purpose. Each resource object stores information concerning the resource in fields such as Nominal State discussed previously. In contrast to the nominal state, which contains the desired status for a resource, the actual known status of the resource is stored in a field known as CMF State. Up events (i.e. resource ONLINE events) and down events (i.e. resource OFFLINE events) shift the CMF state of a resource object as follows. (a) A down event takes the state to dead (i.e. unavailable), and if the previous state of the resource was not up (i.e. not ONLINE), then no resource reallocations are attempted, and if the previous state of the resource was up, then an atomic computation is carried out for updating the CMF state. The atomic computation implies Mounties' cognizance of the resource's new status. In the atomic computation, just before the resource's CMF field is marked as dead, the resource object is removed from dependent resources field of the repository object of each of its supporting resources, as represented at 504 in FIG. 20. Later (outside the atomic stretch), resource reallocations are attempted. (b) An up event takes the state from dead to down, and if the initial state is anything other than dead, then the event is ignored. If the event takes the state from dead to down, then resource reallocation is attempted.

Referring now to FIG. 4, the preprocessor, postprocessor, optimizer, and gossamers modules communicate with each other using task queues as follows. The decision to do a resource reallocation (e.g. in response to a resource up or down event) results in the creation of a preprocessor task that is deposited in the entry queue of the preprocessor module. The task is an object, which has an entry method, which when invoked by a Mounties scheduler (see section on programming paradigm) results in the task being executed. The execution of the task results in either a postprocessor task being deposited in the postprocessor input queue, an optimizer task being deposited in the optimizer input queue, or both. Both of these tasks are scheduled by an invocation of the entry method associated with the individual tasks. The optimizer task upon execution results in a postprocessor task (a postprocessor task is also called a postprocessor plan) being deposited in the postprocessor input queue. The execution of a postprocessor plan results in one or more gossamer tasks being created and placed in the input queue for gossamers. Gossamers also communicate with the postprocessor module independently of this task queues layout. This queues layout is included in communication arrows depicted in FIG. 4.

The Resource Repository

The Repository of resource objects provides a local, somewhat minimal, and abstract representation of the cluster. The repository cache is coherent with the actual cluster to the extent that cluster events are successfully generated and reported to Mounties. Mounties does safe/conservative cluster management without any assumptions of: (a) completeness of the set of events received by it; (b) correctness of any of the events received by it; and (c) (firm) significance of the temporal ordering of the events received by it. Generally, the effectiveness and efficiency of management depends upon the completeness, correctness, and speed with which events are reported to Mounties, but Mounties does not become unsafe even if event reporting degrades. Within the above event-reporting context, Mounties does assume ownership of the management process, so resources are not expected to configure themselves independently of Mounties. If the context requires say human intervention and direct configuration of resources, then either this can be routed through Mounties, or the semantics of the events reported to Mounties modified so that Mounties remains conservative in its actions.

Figure 20:
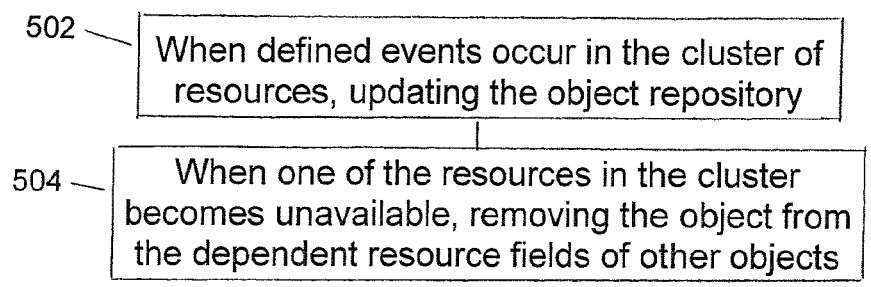
FIG. 20 illustrates the use of an Object Repository to mirror events in the Resource Cluster.

Regardless of its current state, the repository is, as represented at 502 in FIG. 20, updated with an event before the preprocessor is informed. The updating of the repository is an atomic act: readers of the repository either see the update fully, or not at all. The repository is partitioned, and individual resource object can be accessed individually, so the synchronization requirements of such updating are limited. Partitioning of the repository serves many purposes, including permitting higher concurrent access and better memory use and reduced traversal and searching costs.

Resource objects in the repository contain only a few fields representing necessary information such as current status, desired status, and the current supports of the resource, etc. Snapshot related information (e.g., a time-stamp when the last snapshot was taken and is the object now ready for another snapshot) as well as information on the planned actions to be taken are also stored in the resource objects. Since the repository is read and modified concurrently, it is mandatory to reason about all possible combinations of concurrent actions that can take place in the repository so that no erroneous combination slips through. This is carried out by (a) restricting the concurrent access and modifications to only a small set of states in the resource objects, and (b) establishing/identifying invariants and other useful properties of these fields such as monotonicity. For example, we know that cluster events can only change the state of a resource from on-line to off-line or failed and not from failed to on-line since the change to on-line from any state requires a Mounties command.

As mentioned previously, the temporal order between Mounties' commands within and across events is maintained explicitly in a dataflow manner. This is carried out by maintaining an ordered first-in-first-removed sequence of gossamers in each resource object (in the repository). For a resource, the sequence identifies at any time the order in which gossamers have to still carry out or complete a command on the resource. This field is accessed by the multiple threads that need to know of the status of commands on this resource. Just before the thread for a gossamer command completes its execution, it removes its gossamer from the ordered sequence. This announces (passively) to the rest of the system that the command has completed its execution on the resource. This is the only way that the sequence is reduced by the system. The sequence is increased each time a gossamer on the resource is created. As a part of the creation of the gossamer, the gossamer is added in temporal order to the sequence. This is the only way by which the sequence is increased by the system.

A brief note on timing, race, and semantic issues of the shared, concurrent Mounties repository is as follows. In a resource object, the shared, concurrent, read and write state comprises of (a) the CMF state field (b) the ordered gossamer sequence field as discussed above, and (c) the supporting resources list and the dependent resources list in the object. These fields are read and written asynchronously and concurrently. In order to do this safely without requiring any specific atomic read/write properties from the underlying language (e.g. Java), all reads and writes on the fields are carried out solely in protected sections. In our Java implementation, Java's synchronized methods are used. For example, the reading and writing of a CMF state for an event is carried out atomically within a synchronized method for the state so that during this time, no other thread can alter the same state. In order to have a consistent view of CMF state throughout the processing of an event, the CMF state is sampled and copied (into concurrently immutable space) exactly once for each resource possibly affected by the event. The sampled CMF state is not current and instead is expected in the sense that pending gossamer commands on the resource are conservatively assumed to result in success. This sampling is carried out by the preprocessor when it forms partial copies of resource objects for an island (see later) into a CMF State field in the partial copies. As far as Mounties is concerned, an up or down event on a resource only conveys the message that the island containing the resource needs to be re-evaluated. The CMF state of a resource as reported by an up/down event is ignored and instead is sampled only from the resource object in the repository by the preprocessor. Such a sampled CMF state can be different from the state as reported by the event because a later event or gossamer command could have changed the state further. What is guaranteed is that the sampling of CMF starts directly from resource objects.

The Evaluator and Decision Processing Mechanisms

The Preprocessor

As shown in FIG. 4, events arrive from the cluster and are recorded in the repository module. If an event needs attention by the Preprocessor, then the event is also placed in the input queue of the Preprocessor after it has been recorded in the repository.

When there are one or more events in its input queue, the Preprocessor creates a snapshot of the relevant cluster-state by identifying and making a copy of the affected part of the repository. While the repository is constantly updated by new events, the snapshot remains unaffected. Any further processing, in response to the event, takes place using the information encapsulated in the snapshot. Note that the snapshot may capture some of the events that are yet to show up in the Preprocessor queue. Since the repository is more up-to-date, the Preprocessor treats the snapshot as representative of all the events received so far. Note also that because of the atomic nature of the updates to the repository, a snapshot captures an atomic event entirely, or leaves it out completely. For identifying the part of the repository affected by an event, the Preprocessor partitions the cluster resources into disjoint components, called islands, by using the constraint graphs formed by the resource dependencies and collocation constraints. Clearly, an event cannot directly, or indirectly affect resources outside its own island. Such partitioning also serves the purpose as an optimization step prior to applying the global optimization step, by creating multiple smaller size problems, which are less expensive to solve. This is especially beneficial at cluster startup time, when each island can be processed as a small cluster.

Preprocessing includes many more activities: excluding ineligible events (an event can be ineligible for reasons like Mounties is busy with processing a previous snapshot comprising the event's related resources, and thus processing the same resources in another snapshot may lead to divergent action plans which cannot be reconciled); clubbing multiple events (in conjunction with the repository's predisposition) into a larger event; optimizing the snapshot associated with one or more events so that either the event can be handled directly by the Preprocessor, or can be posed as an optimization problem to the Optimizer. A somewhat advanced, but optional treatment of the Preprocessor is to partially evaluate an event using a basic set of rules so as to reduce the amount of processing done by the Optimizer. In general, this can lead to globally non-optimal solutions, but in many instances simple rules can be constructed and embedded in the Preprocessor so as to keep the solutions globally optimal while reducing the load on the Optimizer.

The process of clubbing together events is arrived at in the process of creating a snapshot of the island wherein the sampling of data from repository objects of the island into their partial copies effectively combines the effect of all events that have been registered (updated) in the repository.

When the preprocessor picks an up/down event for processing, it marks all resource objects in the island affected by the event as being analysed. These resources are unmarked by the postprocessor plan for the event, after gossamers for the island have been created by the postprocessor plan. The preprocessor is disallowed from picking an event for processing for which the affected resources (the island) are being analysed.

When the preprocessor actually picks up an event for processing, it can find itself handling an island in which gossamers for a previous event are still being processed. In such a case, the preprocessor samples into its repository object copies, the expected CMF states assuming no gossamer command failures.

The setting of CMF state in each copy is carried out atomically using a locked section as usual, and involves a reading of the gossamer-sequence field and CMF-state field of the corresponding repository object.

For the purpose of providing the optimizer with additional information for taking into account issues related to reducing excessive resource migration, it is desirable to provide to the optimizer a not-necessarily-correct approximation of the existing solution that is up or could (soon) be up so that the optimizer can take its decisions in the context of this solution. The approximate solution is provided via a supporting-resources field in each repository object copy. The supporting-resource field conveys approximately to the optimizer the supports that are used by any up resource. The supporting-resource field of a copy is filled as follows: if a resource is sampled as up without any gossamer still to act on the resource, then the supporting-resources field of the resource's repository object is copied into the supporting-resources field of the copy; if a resource is sampled as up based on the expected successful action of an up gossamer, then the supporting-resources field of the copy is filled using the expected (repository object) supports for the resource stored in the up gossamer. In a later, separate pass, each supporting-resources field in the copies is modified to replace each repository object with its corresponding copy.

This results in all references from the copies' supporting-resources fields getting expressed in terms of the copies alone. In this later pass, a check is made that if any resource's expected CMF state has been sampled as dead in the creation of the copies, then the resource is removed from the supporting-resources field of all the copies.

The Postprocessor

Using the cluster status contained in a snapshot, a new cluster configuration is created by either the preprocessor alone, or by the preprocessor and the optimizer jointly. The configuration primarily indicates the supporting resources to be used in on-lining the resources in the snapshot. The solution is in the form of a graph, outlining the choices to be made in bringing up the resources in the snapshot. Note that, in the cluster, some of these resources may yet to be configured; some other resources may already be configured and up, as desired by the solution, while the remaining resources may be configured differently and may require alterations. The postprocessor takes this into account and partitions this solution graph into one or more disjoint components that are then handled by simple finite-automaton like machines called the up- and down-gossamers. Commands within a disjoint region are executed in a pipelined or concurrent manner, as discussed earlier. Across disjoint regions these can be carried out concurrently.

When the Postprocessor picks up a solution to translate into commands and control machinery (one or more gossamers), the Postprocessor notes into the repository the availability of the resources comprising the solution for new analysis. This makes events related to these resources eligible for preprocessing (see above). For Mounties Central supported by a single-processor node, a convenient task size for the Postprocessor is from picking up a solution to the creation of gossamers related to the solution. The Postprocessor can make auxiliary solutions available to a gossamer as the following. If a resource cannot come up because of a failure of one or more issued commands and a suitable alternative resource exists (with spare capacity to support another dependent resource) then that alternative is treated as an auxiliary solution.

The system conservatively interprets all dependencies as hard dependencies—which means that a resource is brought down (temporarily) even if all that happens is that its supports are being switched. A generalisation to hard and soft dependencies is straightforward. Gossamers are of two kinds—onlining and offlining. Onlining gossamers bring resources up and offlining gossamers bring resources down. The structure of onlining and offlining gossamers is symmetric: each has a single root node. Onlining commands are executed in a bottom-up mariner by a gossamer, and offlining commands are executed in a top-down manner by a gossamer. A gossamer executes an onlining/offlining command by simply calling a method for the purpose defined in the resource's repository object.

For a given solution, gossamers are created as follows.

Offlinesteady_state=Island—Onlines is a set of resources that will be offline in the island in a steady state sense after the event (i.e. after a long period of time, assuming that no failures and events occur in the cluster). Here Island is the set of up, down, and dead resources present in the island, and Onlines is the set of resources that the optimizer or preprocessor has decided as should be online after the event. Let Offlinelargest=Offlinesteady_state r {r or an (in)direct dependent of r such that r is Up, and one or more supporters of r will be changed by the current postprocessor plan}. Offlinelargest is the union of all the resources that will be offline in a steady-state sense, and those that have to be temporarily offlined in order to process the current event under hard dependency assumptions. The resources that have to be brought down using offlining gossamers are given by the set Offg=r is Up—r belongs to Offlinelargest}. The roots for offlining gossamers are given as follows. Roots={r—r belongs to Offg and r is a top-level resource} r—r supports a dead or down resource, r does not have a dependent resource belonging to Offg, r belongs to Offg}. Given the roots for the offlining gossamers, one gossamer is created per root by finding the maximal set of resources that are up recursively in order to support the root such that the no element of the set has been included in another offlining gossamer. The gossamers are created sequentially, so this method tends to make the earlier gossamers larger than the later ones. Onlining gossamers are comprised as follows. Let C=r—r is up, r belongs to current island. ContinuingOn=C−Offg is the set of resources that continue to be on from before the current event to afterwards. Onlining gossamers are made of all the resources that belong to Onlines and do not belong to ContinuingOn. The roots of onlining gossamers are the top-level resources belonging to the gossammer.

While an island is released for new preprocessor tasks after it is released from being analysed, the processing of postprocessor plans on the island is blocked until all gossamer commands on the island for a given postprocessor plan have completed. The postprocessor checks that any plan it picks up from its input satisfies this condition prior to picking it up. This restriction is enforced so that the solution from any event in terms of supporting resources fields and dependent resources fields in repository resource objects is fully formed before gossamers for a later event are created.

Gossamers

Each gossamer is a simple finite-automaton like machine, which is responsible for changing the state of its set of resources to ONLINE or OFFLINE and follows the dataflow order. Simultaneous execution by multiple gossamers brings a high-degree of concurrency to the execution process. The simplicity in their design allows these entities to be spawned just like auxiliary devices while the more interesting and "thinking" work is kept within the other modules (e.g., the Postprocessor). A gossamer executes its commands by "wiring up" the relevant part of the repository with the solution-set assigned to it. Mounties attempts to bring down a resource only after it has confirmed that all resources dependent on such a resource are currently down. A "go ONLINE" command for a resource is dispatched only after receiving positive acknowledgements for all the supporting resources, and checking that the supporting resources have enough capacity for the upcoming resource (i.e. all necessary resource downs have occurred). This naturally leads to the execution of the commands in a dataflow manner.

The process of on-lining and off-lining of resources in unrelated parts of a solution can proceed simultaneously in a distributed manner. If a resource fails to come up after being asked to do so, the related gossamer asks (the Postprocessor) for auxiliary solutions for the same resource in trying to bring dependent resources of the same up, upon their individual turns.

Gossamers at present try to handle up/down command failures by dynamically substituting with auxiliary solutions as follows. When an up command finds that it can be scheduled (all commands that it is dependent on have executed), however, not all of the supporting resources required are up, then the up command asks its postprocessor plan (using a method call) to advise it about all substitutes for each down/dead supporting resource such that each substitute belongs to an applicable equivalency, and the expected CMF state of the substitute in the postprocessor plan is up. Any substitute has to acquire/have a CMF state up and have adequate spare capacity to support the extra load prior to being used as a replacement. The up command tries to use the first substitute that it finds as up with adequate spare capacity. The up command fails if it finds that for a given down/dead supporting resource, all substitutes have settled, and there is no substitute that has settled as up with adequate spare capacity. Whenever a resource is used as an auxiliary solution its spare capacity is reduced by one to reflect the extra load that it has accepted. The strategy for using an auxiliary solution in bringing a resource up is similar to the ordinary case of bringing a resource up—along with the other supports that the resource needs, all potential auxiliary solutions are waited upon to settle after which valid auxiliary choice(s) are also verified and made in order to bring the resource up on the supports and the auxiliary choice(s).

If despite all attempts to bring up resources using auxiliary solutions, a top-level resource does not come up due to command failures, then an artificial event is generated for the purpose of reevaluating the island status globally. This is done as follows. Whenever a top-level resource fails to come up, its contribution to the optimization objective for the island is added to a field for the purpose in the current postprocessor plan. Thus starting from zero, the field collects the contribution of all failed top-level resources for the plan. When all failures have been recorded, the contribution is compared with the attained objective for the island. If the attained objective is less than the objective collected for the failed top-level resources, then an event on the island is immediately inserted in the preprocessor queue. If the objective is less, then a timer is invoked that inserts an event on the island into the preprocessor queue after a certain amount of time has elapsed. The elapsed-time is a function of the collected objective and the attained objective.

Commands are managed in terms of repository objects for resources as follows. Gossamer failures are treated as follows: Each gossamer up or down failure leads to the setting of the CMF state of the resource's repository object to dead or down. This occurs within a locked section of the gossamer command over the resource. Gossamer down-command successes are treated within a locked CMF section as follows: Each resource down success sets the resource's CMF state to down, and (just) prior to that removes the resource from each of its supporting resource's dependent field. A gossamer up-command success can cause several locked-section attempts at bringing a resource up in two steps process that comprises of a basic step as follows: First a lock on the resource being brought up and all its supporting resources is acquired (using a one attempt per lock only till either all locks are acquired; if any attempt fails, then all acquired locks are released and a new attempt at acquiring the locks is made), the resource being brought up is verified as not being dead, the supporting resources are verified as being up, and each supporting resource is verified as being capable of accommodating the load of the resource being brought up (current load of a resource is defined by the number of resources in its dependent-resources field). If only the supporter load verification fails (other verification failures are discussed below), then all the locks are released and the (step 1's) attempt at bringing the resource up is deferred to a later attempt. If all verification succeeds, then, for step 1, a reservation ticket for the resource being brought up is added to the dependent field in each of its supporters, and for step 2, in case of feedback being successful, the CMF state of the resource being brought up is set as up, the dependent-resources field (in repository object) of the resource (being brought up) is reset to empty, the resource's supporting-resources field is filled (in repository object, with all supporting resources).

Cluster Startup and Shutdown

Cluster startup is the only event allowed initially. When cluster startup occurs, the CMF state of all resources in the PoJ is taken to be down. For each island, a separate optimizer task or direct postprocessor plan is created for startup. This leads to the creation of multiple postprocessor plans for startup, which are then handled as usual by the postprocessor.

Cluster shutdown is handled as follows. Repository object copies are created for the entire cluster, and a shutdown postprocessor plan is created directly by the preprocessor wherein an empty Onlines set that covers all islands is provided. When the postprocessor (via, the scheduler) finds itself looking at a shutdown plan (in its search for a plan that is ready to execute), the postprocessor executes the following special sequence: the postprocessor stops searching for any other plan to execute and simply waits for all gossamers on all islands to complete after which the shutdown plan is executed. Thus all other plans present in the postprocessor queue are ignored. Going island by island, the postprocessor creates only offlining gossamers for all up resources in the cluster, using the usual method for creating gossamers. The scheduler is cognizant of cluster shutdown as follows: after a cluster shutdown event is scheduled for the preprocessor, the scheduler never schedules the preprocessor; after a shutdown postprocessor plan is scheduled for the postprocessor, the scheduler never schedules the postprocessor; after all gossamers for shutdown have completed, the scheduler informs the administrator/user and with his permission, exits.

Some Other Services

The Event Notification and Event Handler Mechanisms Mounties Central and Mounties Agents are associated with a component of the Event Handler. We use Java RMI layer as the event notification mechanism. The central handler gets requests from the agents, which are serialized automatically by Java RMI and communicates back with the agents, again using Java RMI. Because we use the standard services provided by Java RMI, we do not describe those in detail here. We note here that the more reliable event notification mechanisms can replace the RMI-based event notification layer, in a straightforward manner. All resource managers in the cluster, various Mounties agents, and Mounties Central, as well as Mounties GUI all are glued together by the event notification mechanism. We describe the GUI component in detail below.

Mounties GUI

The GUI displays various graphical views of the cluster to the end user, in response to the submitted queries and commands. These requests are routed through the Event Notification mechanism.

Java's EventDespatcher thread writes the request in the form of an event in an input queue of the EventHandler. The EventHandler then requests for the required data from Mounties Central. When the necessary information is received, the EventHandler communicates the same to the Mounties agent that is local to the node where the initial request came from. The actual rendering is then done by the GUI. The two-way communication between the local Mounties agent and the Mounties Central is done over a layer of Java RMI. Using the GUI, the user can view many of the important characteristics of the resources being managed.

There are three separate panels, each displaying some aspect or the centralized Resource Repository. The first panel displays the entire constraint graph and dependency information in a hierarchical manner. The nominal state, priority, and location of each resource are also displayed in this panel. The display on this panel does not change during a session unless resources/constraints are added/modified dynamically. The second panel displays the decisions made by the Optimizer and/or the Preprocessor. It shows the resource allocation in a hierarchical fashion. The priorities of the resources are also displayed. This display can be updated each time there is a new solution. This display is on an island basis. These decisions cannot be instantaneously reflected in the cluster and, in some cases, they may not executed because of failures in the execution. The current state of the cluster as seen by Mounties, is shown in the final panel. The final state in shown in this panel may differ from the proposed solution shown in the second panel because of two reasons: (1) command failures may occur and (2) an auxiliary solution may be selected as a local substitute for a failed resource.

The GUI for Mounties can be distributed across a network of machines in order to cater to a distributed basis of cluster supervision and management. For this, each terminal can send its plot request to Mounties central. The event handler simply puts such a request in the preprocessor queue. The preprocessor creates the relevant snapshot and puts it in the outgoing queue. If the plot request is local, then say a plotter thread can be forked that does the local display. For a plot request, the data sent to a terminal/node is as follows: since the last plot on the terminal, data from all islands that have faced an event processing is sent to the terminal. Each island tracks terminal status for this purpose now. Display on a terminal can show (parts of) the new data and/or (parts of) the old, unchanged, cached data.

Resource Groups

A resource group is a 4-tuple, <a set of resources S, a CMFstate CMF belongingTo {Online, Offline}, a nominalState N belongingTo {Online, Offline, Not-in-Effect}, a set of nodes ND> such that:
1. S contains at least one top-level resource (TLR), and all resources in S are either TLRs, or (in)direct supports of S's TLRs.
2. No TLR belonging to S may belong to a resource group other than S.
3. If N is Online, then CMF can be set to or kept as Online only if all the TLRs in S are up and all of the TLRs in S and their supports in S are collocated on a node belonging to ND.
4. Unless N is Not-in-Effect, if CMF is Offline, then no resource in S can be brought up or left Online unless the resource (in)directly supports a resource not in S.
5. If N is Offline then CMF is Offline.

A resource group is said to be up if for the resource group, N and CMF are Online. A resource group is said to be down if it is in effect (i.e. N is not Not-in-Effect), and CMF is Offline. For a resource group, unless N is Not-in-Effect, a change of CMF to Offline can result in a forcing down of all members of S that do not (in)directly support resources outside of S. Mounties allows a user to specify a priority for a resource group which defines the relative importance of the resource group. The default priority for a resource group is the highest priority among TLRs belonging to the resource group. The individual priorities and nominal states of a resource group's TLRs are meaningful only when the nominal state of the resource group is Not-in-Effect. For a resource group, unless the user specifies ND explicitly, ND is assumed to be the set of all nodes of the cluster.

The above definition allows the entire graph supporting a set of TLRs, or any portion the same graph to be included in a resource group. In particular, the above definition allows S-contained supports for a TLR in S to be partitioned such that no dependency edge inbetween resources comprising the TLR and the supports crosses a partition boundary.

To reiterate, for a resource group, unless N is Not-in-Effect, the nominal state of the resource group governs the nominal states of all resources in S. CMFstate of a resource group is Online, only if the nominal state of the group is Online and CMFstates of all TLRs in S is Online; otherwise, the CMFstate of the resource group is Offline.

Implementation

Resource groups are implemented using proxy resources. For a resource group, <S, CMF, N, ND>, the central entity representing the resource group is a proxy TLR that is constructed as a resource that depends on the TLRs contained in S. Strictly speaking, after this construction, the TLRs of S lose their top-level status, however, for the sake of discussion, we will continue to refer to them as TLRs. The top-level proxy will be referred to as the proxy TLR. Besides the proxy TLR, one proxy leaf-level resource is constructed for each node contained in ND. The proxy leaf is defined as fixed on its corresponding node (i.e., the proxy is assigned the location of the corresponding node). The CMFState and the nominalState of the proxy leaf is set to Online. All proxy objects and the postprocessor are aware of the proxy nature of these objects. For example, they do not have any corresponding real resources in the cluster with which they attempt any correspondence. Next an equivalency of the leaf-level proxies is made. The proxy TLR is defined to depend on the equivalency, and also to be collocated with the choice from the equivalency. For now, proxy LLRs (leaf level resources) are not shared across resource groups, so a capacity of one suffices for proxy LLRs. The proxy TLR is defined to be collocated with all the resources contained in S. As detailed later, CMF and N of the resource group are maintained in the proxy TLR's CMFstate field and NominalState field, respectively.

In the above construction, proxy LLRs are built in order to let the optimizer have the option of not treating nodes as resources. Thus a nodes equivalency has to be presented as a proxy LLRs equivalency in which each leaf represents a node.

Direct events on resource groups that are supported are (all possible) nominal state changes only. Indirect events on a resource group are events on the resources contained within the resource group which can result in the resource group being brought up or down. When a resource group goes to nominal state Online, then the construction above for the resource group is inserted in the problem graph and the island containing the resource group is reevaluated. For this, the definition of islands is weakened as follows: if a resource group falls on multiple islands, then, even if the resource group is Not-in-effect, the multiple islands are collapsed into one large island. When a resource group becomes Not-in-Effect, then the construction above for the resource group is removed from the problem graph and the island containing the resource group is reevaluated. For nominal state Offline, before a resource group's nominal state changes to Offline, it is ensured that the CMF for the group is set to Offline. The island containing the resource group is then evaluated with no proxy resources and no TLRs of the resource group passed to the optimizer. Changing the nominal state of a resource group to Offline thus typically leads to the resources of the group being brought down unless the group's nominal state is changed to something else before the island containing the resource group is reevaluated. CMF of a group is disallowed from changing while the nominal state of the group is Offline.

The CMFstate of a proxy TLR represents CMF for the associated resource group. CMFstate up represents CMF=Online and CMFstate down represents CMF=Offline. CMFstate dead is disallowed for a proxy TLR. In an Online RG (resource group) with Online CMF, whenever a resource (it's repository object) loses its up status, the CMFstate of the proxy has to also lose its Online status in the same atomic computation. NominalState field of the proxy TLR is extended to have a third state, Not-in-Effect. The nominal state field represents the nominal state of the resource group straightforwardly, with NominalState up representing N=Online, NominalState down representing N=Offline, and NominalState Not-in-Effect representing N=Not-in-Effect.

Changes to the nominal state of a resource group are carried out solely from the graphical user interface by an administrator. Each change locks out the proxy TLR object from all concurrent access for a short duration. In this atomic section, the change request ensures that CMF change to Offline precedes nominal-state change to Offline. Once the locked section is over, the request adds an event to the preprocessor queue if the request had indeed changed the nominal-state field from one state to another. The preprocessor handles nominal-state change events on a resource group as usual—for the island concerned, it clubs all collected events together by sampling the repository to get the cumulative effect of multiple events including multiple nominal-state-change events. This is followed by the usual reevaluation of the allocations for the island.

Whenever an island containing an Online resource group is evaluated, special attention has to be paid to how the resource group is brought up or kept up since failure of a gossamer command on a resource group has to result in the entire group being brought down. This is done by creating gossamers for conditional offlining of resources. The members of a conditional offlining gossamer for conditional offlining of resources belonging to an RG comprise of the intersection of the RG's S and the Onlines set for the island containing the RG. The root of the gossamer is one—the proxy TLR of the RG. These commands execute only after the up command on the proxy TLR executes. If the proxy TLR is brought up, then all the conditional gossamer commands execute as nops—the commands execute in dataflow order from the root down as nops. If the proxy TLR fails to come up, then each conditional down command executes in dataflow order as either (a) a standard down command in case the resource it executes on supports no up resource, or (b) a nop in case the resource it executes on supports an up resource. It is possible to reduce the number of executed up and down commands in case of RG failure by concluding RG failure and taking appropriate action as soon as any TLR in an RG fails to come up.

Auxiliary solutions for gossamer up command failures are limited in resource groups by the collocation requirement of resource groups. Screening for collocation is done dynamically when an auxiliary solution from within the RG is picked for handling gossamer up command failure.

When cluster startup is done, then all resource groups are checked for correctness. The check comprises of tests for the first two conditions in the definition above of RGs. If an RG definition is incorrect, then the nominal state of the RG is set to Not-in-Effect, the user is informed of the condition and action taken, and changes to nominal state of the RG are disabled. Besides correctness checking, startup also witnesses the initialisation of RGs by proxy resource construction. All resource groups whose nominal states are Online find their proxy resources and collocation constraints activated, resource groups with nominal state Not-in-Effect find their proxy resources and collocations disabled, and esource groups with nominal state Offline find their proxy resources and TLRs removed from consideration by the optimizer.

Dynamic Graphs

All dynamic changes to problem graphs in terms of events indicating resource changes, constraint changes, collocation changes etc. are described here. A graph change event, or graph event, is generated by the system administrator/user. The result of the graph change event is an acknowledgement from Mounties that the resulting change has been carried out by Mounties. After this acknowledgement, the user can say physically remove the deleted resources, and start using the newly added resources etc. The acknowledgement is flashed on the GUI of the system administrator/user.

Introduction of graph events brings in another event queue in the system. All events are first stored as they arrive in this queue before an attempt is made to inform Mounties about them via an atomic update to the repository. A graph event requires some prior processing before an attempt to update the repository with can be made, and some graph events can be explicitly delayed while other events pass them by. A graph event can also force a delay in other events. Although the incoming event channels are themselves queues and thus can substitute for the queue above, an explicit handle on those queues is required for the purpose of the discussion below. The event handler component local to Mounties Central that has a handle on its input channels contains and implements the above queue (called the input queue in the following) and does the prior processing for graph events.

When the event handler gets a non graph event in its input queue, it processes the event immediately unless the event is blocked by some graph event. For this purpose, the event handler needs to identify only the island of the event and for this, the event handler refers to the repository in a read-only manner. In processing the event, the event handler updates the repository atomically for the event and causes the creation of a preprocessor event for the same.

When the event handler gets a graph event, it quickly identifies the minimal set of islands that are affected by the event. The event handler leaves the event as is if any of the islands's events have been blocked by some prior graph event processing. Otherwise, the event handler collects all graph events in its input queue that have not been blocked, and that affect any island in the above identified minimal set of islands. The minimal set of islands can expand each time another event is collected, and this increase can make more events become eligible to join the collection. Thus the minimal set of islands and collection of events increase recursively. Regardless of clubbing, the identities of individual events are remembered for acknowledgements that have to be sent later. A clubbed event can comprise of other clubbed events that were previously formed, but not processed beyond clubbing. A clubbed event is not ready for processing if there exists a pending task in Mounties related to any island affected by the clubbed event. Mounties has to be completely drained of all tasks related to a clubbed event's islands for the clubbed event to be processed. Mounties by default gives a higher priority to non graph events over clubbed events, and any new arrival that is a non graph event jumps ahead of a clubbed event whose processing has not yet started. A clubbed event is picked for processing only when Mounties is fully drained, and no new non graph arrival affects any island affected by the clubbed event.

In processing a clubbed event, the event handler first blocks all graph and non graph events on the islands affected by the clubbed event. The event handler then creates a special shutdown event for the islands affected by the clubbed event. The shutdown events are processed in a manner that is similar to the cluster shutdown event, except that only a subset of the cluster's islands are shut down. The clubbed event remains in the event handler's input queue until all its related shutdown tasks have completed. Next, the repository is modified to reflect the new problem graph defined in the clubbed event. This can lead to a new set of islands in place of the old set associated with the clubbed event. The input queue of the event handler is then traversed fully to change the island identifications of any blocked arrivals on the old islands of the clubbed event. The identities of any deleted resources are remembered in order to be able to screen out events from such resources such as resource dead event, resource back from dead event. Next, the clubbed event is removed from the event handler's input queue and treated as a special startup event for its new islands. The clubbed event is treated in a similar manner as cluster startup except that it serves to startup only the subset of cluster islands identified with the clubbed event. Once the event handler has processed the clubbed event by removing it from its input queue, and passing it on to the repository and preprocessor, the event handler then unblocks all events affecting the islands of the clubbed event. Next the event handler is free to acknowledge the processing of the clubbed event by Mounties to the pertinent system administrators/users. The event handler can do this right away or later.

The work done by the event handler in all of the above is small. The heaviest task for the event handler is the creation of the modified repository and islands for a given event. This the event handler can get another thread to carry out. As far as concurrent processing of events goes, the event handler can be processing multiple clubbed events and other events in different parts of the cluster at the same time. An important optimization (for the preprocessor) given the above context is to not do a simple complete shutdown event treatment for a clubbed event's shutdown. Instead, the special shutdown event should only bring down a minimal number of resources needed for changing the problem graph—e.g. bring down only resources that have to be deleted and the resources currently supported by them. The startup for the clubbed event later can then benefit by not having to bring up all resources. For the purpose of startup, any artificial events set that causes the reprocessing of the affected islands suffices.

Structuring Mounties Implementation

Implementation of Mounties architecture and design imposes a challenging requirement for the software developer—the challenge being how to ensure that the software developed is correct, robust, extensible, maintainable, and efficient enough to meet soft real-time constraints. In this section, we describe a programming paradigm that is well suited to meet these requirements.

A concurrent specification is naturally suited to Mounties and is more likely to yield a verifiably correct and robust implementation of the system. A simple and concurrent implementation of Mounties would comprise of a CSP-style process [see, C. Hoare, Communicating Sequential Processes, Prentice Hall International (U.K.) Ltd., 1985] for each functional block described earlier. Each such process would then communicate with other processes via communication channels, and the entire operation would then proceed in a pipelined manner. Such a specification however can suffer from two problems: (a) complexities associated with managing parallelism including state sharing and synchronization, and (b) inefficiency of fine-grained parallelism. Both of these problems can be addressed by using a different approach than the CSP approach, as described in the following. The approach described here enables a variable-concurrency specification of Mounties and is consistent with the overall operational semantics of Mounties described previously. The paradigm also provides a few additional benefits such as: efficiency and ease in performance tuning; simple extensions to simulate events using cloned copies of the repository; flexibility and amenability to changes in functionality (e.g., adding more Preprocessor smarts).

Efficient and Flexible Concurrent Programming

The paradigm comprises of an approach of defining relatively short lived, dynamic, concurrent tasks wherein the tasks can be in-lined. In the limit of this approach, all of the tasks can be in-lined, resulting in a sequential implementation of the system. The key issue in this approach is not to compromise on the natural concurrency in the description of the system while defining the dynamic, concurrent tasks, and task in-lining.

In this paradigm, computations are broken into a set of atomic tasks. Tasks are defined such that (a) each task is computationally significant as compared to the bookkeeping costs of managing parallelism; and (b) each task forms a natural unit of computation so that its specification is natural and straightforward. In initial prototyping, (b) can overrule (a), so that correctness considerations of initial work can override performance considerations. Each atomic computation described in a detailed Mounties semantics has to be contained in a task from this set of atomic tasks. Although this is an optimization and not a requirement, for reducing context-switching costs, the computation of a task should proceed with thread-preemption/task-preemption disabled.

Under this paradigm, the operations within Mounties can proceed as follows. Each event from the event handler results in the creation of one or more tasks, to be picked by the one or more threads implementing Mounties. The tasks wait in an appropriate queue prior to being picked. In processing a task, the thread/processor will compute it to completion, without switching to another task. The task execution can result in one or more new tasks getting created, which the thread will compute as and when it gets around to dealing with them. So for example, say an event arises, that creates a Preprocessor-task. The Preprocessor-task can end up creating an Optimizer-task, and a Postprocessor-task. The Postprocessor-task can create gossamer-related tasks, and so on. Allowing for performance tuning and also for later extensions, it may be desirable for the Preprocessor to inline the Postprocessor task within itself and to create the gossamer-related tasks directly, which can be done straightforwardly in this paradigm since tasks are explicit and not tied to the executing threads.

In this programming paradigm, computation and communication are merged. Generally a task is a procedure call, with its arguments representing the communicated, inter-process, channel data from the CSP model. In general inter-module communication is carried out by task queues connecting the modules, wherein, the scheduler is given the charge of executing a task for a module by causing a thread to pick it up from the module's incoming queue. Since in this paradigm, just one thread can implement all the modules, it becomes possible to continue thinking in terms of a purely sequential computation, and to avoid concurrency complexity such as synchronization and locks. If this sequential exercise using this paradigm is carried out in consistence with the Mounties choreography described earlier, then a straightforward extension of the work to multi-threaded implementation with thread safety is guaranteed. The accompanying complexity of lock management and synchronization is straightforward.

The scheduling of threads itself is done in a manner that avoids looping over input. Whenever a thread finds itself in a position that it cannot proceed with the current input or if there is no input present, then the thread deschedules itself. This enables other computation to proceed, which can result in a rescheduling of the descheduled thread.

Related Work

The Mounties system described here is of relevance to both the commercial state-of-the-art products as well as to academic research in this area. Presented below is a comparison of the Mounties System with three important systems that can be considered as the state-of-the-art: IBM's HA/CMP, Microsoft's MSCS, Tivoli's AMS system, and Sun's Jini technology.

Application management middleware has traditionally been used for products that provide high availability such as IBM's HA/CMP and Microsoft's Cluster Services (MSCS). HA/CMP's application management requires cluster resource configuration. Custom recovery scripts that are programmed separately for each cluster installation are needed. Making changes to the recovery scheme or to basic set of resource in the cluster requires these scripts to be re-programmed. Finally, HA/CMP recovery programs are stored and executed synchronously on all nodes of the cluster. MSCS provides a GUI-driven application manager across a two-node cluster with a single shared resource: a shared disk [see, Sportack, Windows NT Clustering BluePrints, SAMS Publishing, Indianapolis, Ind. 46290, 1997]. These two nodes are configured as a primary node and a backup node; the backup node is used normally pure backup node and no service-oriented processing is performed on it. Configuration and resource management is simplified with MSCS: there is only one resource to manage with limited management capabilities.

Tivoli offers an Application Management Specification (AMS) mechanism, which provides an ability to define and configure applications using the Tivoli Application Response Measurement (ARM) API layer [see, Tivoli Corp., Tivoli and Application Management, http:/www.tivole.com/products/documents/whitepapers/body\_map\_wp.html, 1999]. These applications are referred to as instrumented applications. The information gathered from the instrumented applications car be used to drive scripts by channeling the information through the Tivoli Event Console (TEC). The TEC can be configured to respond to specific application notification and initiate subsequent actions upon application feedback. The current version of ARM application monitoring is from a single system's perspective. Future versions may include correlating events among multiple systems.

Over the last few years several new efforts towards coordinating and managing services provided by heterogeneous set of resources in dynamically changing environments. The examples of these include Tspaces [see, P. Wyckoff, S. McLaughry, Tl Lehman, and D. Ford, T Spaces, IBM Systems Journal, pp. 454-474, vol. 37, 1998] and the Jini Technology [see, K. Edwards, Core JINI, The Sun Microsystems Press Java Series, 1999]. The TSpaces technology provides messaging and database style repository services that can be used by other higher level services to manage and coordinate resources in a distributed environment. Jini, on the other hand is a collection of services for dynamically acquiring and relinquishing services of other resources, for notifying availability of services, and for providing a uniform means for interacting among a heterogeneous set of resources. Both TSpaces and Jini technologies are complimentary to Mounties in the sense that they both lack any systematic decision making and decision execution component. However, the services provided by the Repository and Event Notification mechanisms in Mounties do overlap in functionality with the similar services provided in TSpaces and Jini. Finally, there are several resource management systems for distributed environments with decision-making capabilities. Darwin is an example of such a system that performs resource allocations taking into account application requirements [see, P. Chandra, A. Fisher, C. Kosak, E. Ng, P. Steenkiste, E. Takahashi, and H. Zhang, Darwin: Customizable Resource Management for Value-Added Network Services, Proceedings of $6^{th}$ International Conference on Network Protocols, pp. 177-188, October 1998]. Although there are similarities between Darwin and Mounties, Mounties provides a much richer set of abstractions for expressing complex dependency information among resources. Also, the Mounties system is geared towards optimizing the allocation of services such that overall objectives are met; in Darwin the goal seems to be more geared towards optimizing the requirements of an application or of a service.

The Mounties services described here have some similarities with the Workflow management systems that are typically used in automating and coordinating business processes such as customer order processing, product support, etc. As in Mounties, workflow systems also involve coordination and monitoring of multiple tasks that interact with one another in a complex manner [see, J. Halliday, S. Shrivastava, and S. Wheater, Implementing Support for Work Activity Coordination within a Distributed Workflow System, Proceedings of $3^{rd}$ IEEE/OMG International Enterprise Distributed Object Computing Conference, pp. 116-123, September 1999]. Thus, the task and data choreography can have similar implementation features. However, workflow systems typically do not involve any type of global decision making component, much less solution of an optimization problem resulting in commands for the components of the system.

At the implementation level, Mounties software structuring approach or programming paradigm provides a contrast with approaches such as CSP [see, C. Hoare, Communicating Sequential Processes, Prentice Hall International (U.K.) Ltd, 1985], and Linda [see, N. Carriero and D. Gelernter, Linda in Context, Communications of the ACM, vol. 32, pp. 444-458, April 1989]. Briefly, in comparison to CSP, instead of defining static, concurrent tasks, our paradigm works with relatively short lived, dynamic, atomic tasks that can be inlined. Since tasks in our approach are delinked from threads, our approach has the advantage of allowing greater flexibility and control in software development including variable and controlled concurrency, and a finer level of control over task priority and data priority. In contrast to CSP, the Linda approach and futures [see, D. Kranz, R. Halstead and E. Mohr, Mul-T: A High Performance Parallel Lisp, Proceeding of the ACM Symposium on Programming Language Design and Implementation, pages 81-91, June 1989] provide a handle on dynamic threads, [see, D. Kranz, R. Halstead and E. Mohr, Mul-T: A High Performance Parallel Lisp, Proceeding of the ACM Symposium on Programming Language Design and Implementation, pages 81-91, June 1989] provides a method of dynamic thread in-lining, and Linda in particular provides a handle on a coordination structure, a tuplespace, that can straightforwardly emulate and provide the equivalent of CSP channels for data communication. Our paradigm is different from all these programming language approaches in that it is an informal framework wherein implementation issues/idioms relevant to Mounties-like systems find a con-

CONCLUSIONS

The Mounties system, as described above, is designed to support a diverse set of objectives including support for global cluster startup, resource failure and recovery, guarantees for quality-of-service, load-balance, application farm management, plug-and-configure style of management for the cluster resources, and so on. The system itself is composed of multiple services, and the services described here are designed to be general purpose and scalable. This modularity allows for substitution, at run-time, by alternate services including alternate decision making components. Moreover, the system is flexible enough to operate in a full auto pilot mode or a human operator can control it partially or fully. The three services described here (the repository services, the evaluation and execution services, and the event notification services) are adaptable to changes in the system. New resources, constraints, and even new rules or policies can be defined and the system adjusts the cluster-state around these changes. In that sense, these services are active and dynamic components of the middleware. A fourth component of the system, the Optimizer, is also capable of adjusting to such changes in the system.

Finally, it should be noted that the decision making capabilities and associated support services are general enough to be applied in other scenarios including in environments that are much more loosely coupled than clusters and that are highly distributed such those encountered in mobile and pervasive computing environments. In such environments, multiple independent decision support systems can co-exist in a cooperative and/or hierarchical manner. This is an area we intend to explore in the future.

Described below is an approach for on-line modeling and solution of the global optimization problem using Evolutionary algorithms. These problems arise in the managing distributed resource using the decision support apparatus described earlier.

This aspect of the invention relates to the filed of distributed computing, and more particularly, to allocation various resource in the distributed computing environment. The resources need to be allocated to their dependent resources such that a given criterion is optimized.

BACKGROUND

In a mission-critical semiautonomous system, maintaining continuous availability of a set of (mission critical) services is of paramount importance, even in the presence of partial failures. To accomplish this, resources are automatically monitored for their availability, brought and kept on-line as long as their configuration constraints are satisfied. Whenever failures are detected or whenever individual resources need to be serviced, alternative choices are evaluated and resources are re-deployed after taking into account the global state of the system. To accomplish this, the system requires the capability for making decisions taking into account various tradeoffs and the overall objectives set for the system, in the presence of unavailability of a subset of resources.

Typically in complex systems, end user services depend on multiple, lower level services and these in turn may depend on other lower level services. For example, web servers depend on database servers which in turn depend on lower level services such as I/O services, communication services, and even lower level services provided by the OS and the CPU. Together, these inter dependencies form a (directed acyclic) dependency or constraint graph (CG) (refer FIG. 1), where the vertices correspond to the individual services and the edge correspond to the dependency relationships. For a variety of reasons, complex systems invariably consist of redundant services, that provide similar functionality. This results in resource dependency graphs with multiple choices in allocating a particular type of supporting resource or service. We refer to these multiple choices as equivalent services and the set of such services forms an equivalency. In a system, there may be many equivalents each providing multiple choices for a particular type of service. Similarly, a service may appear in more than one equivalency. Furthermore, multiple higher level services may depend on the same lower level supporting service, which in turn may have capacity constraints limiting its ability to serve only a fixed number dependent services at a time. In practice, performance and implementation considerations also require that certain location constraints be satisfied; e.g., use services available on the same node or make sure two services are not located on the same node. These are referred to as the collocation and anti-collocation constraints. In mission-critical systems, an added constraint is that the resource allocation problem must be solved on-line and that the solution must be obtained within a fixed time interval. Please note that throughout this document we use the terms service and resource interchangeably.

To summarize, services depend on one or more types of lower level services, in a recursive manner; there may be more than one resource in the system that provides a particular type of service, possibly at different performance-level. There are one or more services that are mission critical and hence need to be maintained on-line by satisfying their dependency constraints, even in the presence of failures of one or more supporting lower level services. Clearly the problem to be solved here is an on-line resource allocation problem where allocations are to be made such that certain business objectives (such as maintaining continuous availability of high priority services, fulfilling quality-of-service guarantees, load balancing, and so on) are met. In general, this problem is NP-complete. The problem becomes even harder (from implementation point of view) when priorities, preferences, and load-balancing issues are to be taken into account.

There are various approaches for solving the resource allocation problem. These include the algorithms based on approximation, mathematical programming, probabilistic, and local search techniques. Evolutionary Algorithms (EAs), which belong to the class of probabilistic algorithms and include Genetic Algorithms, Evolution Strategies and Evolutionary Programming, have become popular in solving complex optimization problems. EAs, apart from being able to fond better optima, have an additional advantage in the present context because of their iterative nature.

The sub-optional solutions that are found while evolving towards a globally optimal solution can be used by the resource management system for bringing up at least some of the resources earlier instead of waiting for the final solution.

EAs use a population a fixed number of (feasible) solutions; a solution is a representation of an instance in the search space. EAs are iterative algorithms. Each iteration is called a generation. To start with, the population is randomly initialized and is evolved over generations. During each generation, new solutions are created by applying evolutionary operators over the solutions in the current population. These operators mainly include selection, recombination, and mutation operates. Each solution in a population is associated with some figure of merit or fitness depending on the function to be optimized. The selection operator decides the solutions to be maintained in the population during the next generation depending on their fitness values. The recombination operator combines two solutions to yield possibly two new solutions. The mutation operator randomly perturbs the solutions.

The particular scheme used to represent a solution and the associated evolutionary operators determine the computation needed during each generation. The main requirement on an operator is that it should have closure property; i.e., operator should result in a feasible solution. Typically, the operators tend to be computationally intensive while maintaining the closure property. Moreover, simple representation schemes often make fitness value calculations very computationally intensive. Perhaps, that is why, EAs are efficient when they are customized to the problem under consideration.

SUMMARY

This aspect of the invention describes a method and a apparatus using the method to allocate resources to their dependent resources satisfying all the constraints so that specified objectives are optimized. The method is based on evolutionary algorithms. This method uses a simple representation scheme that is specific to the problem under consideration. Under this scheme, the computations associated with the objective functions are relatively light. We also define a simple problem specific mutation operator that has the closure property.

DETAILED DESCRIPTION

Figure 8:
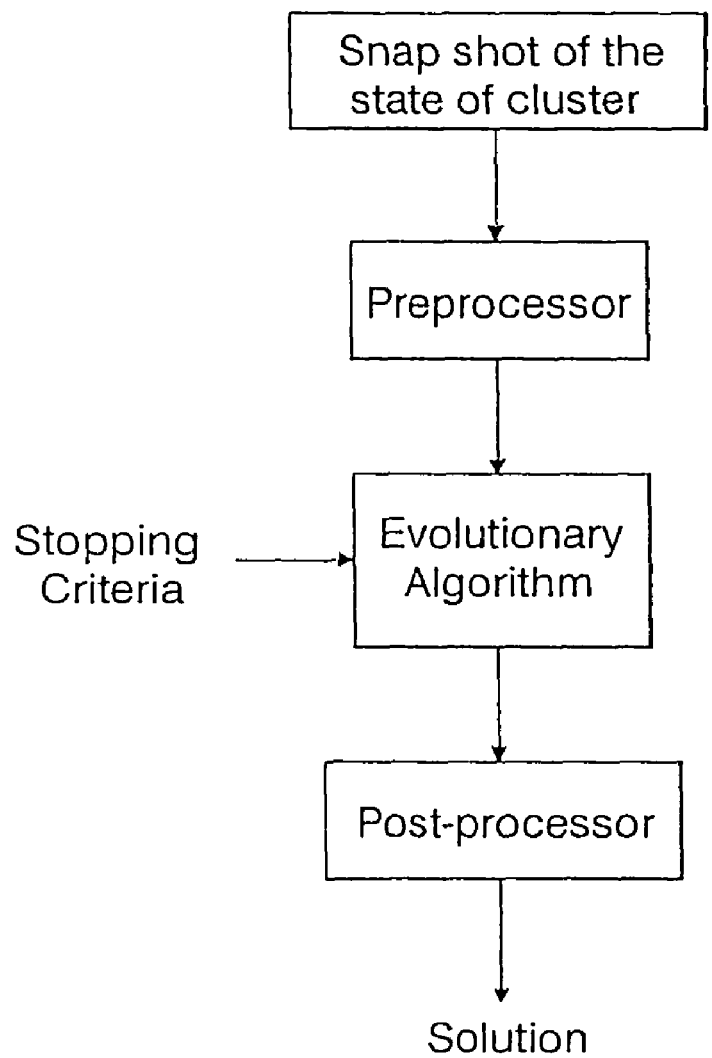
FIG. 8: Block diagram showing the role of optimizer in the whole system.

In the following paragraph, we describe a method useful to find optimal configurations. We describe the overall system before describing the methods. The overall system is depicted in FIG. 8. Whenever there is an event that calls for reallocation of resources, a "snap shot" of the state of the cluster is created and handed over to the preprocessor. As the name suggest, preprocessor prunes the conflicting constraints and outputs a pruned constrained graph. The pruned graph is generated by applying various constraints and reduce the number of resources that can possible support other resources. For example, collocation constraints may result in fewer number of resources equivalencies. The main objective of preprocessor is to reduce the search space for finding an optimal allocations. The optimizer, the key invention in this disclosure, takes a stopping criterion to output the optimal solution. The stopping criterion could be time to calculate an optimum. The result of optimizer is directed to a module called post-processor, which issues commands for actual execution of reallocation.

Figure 9:
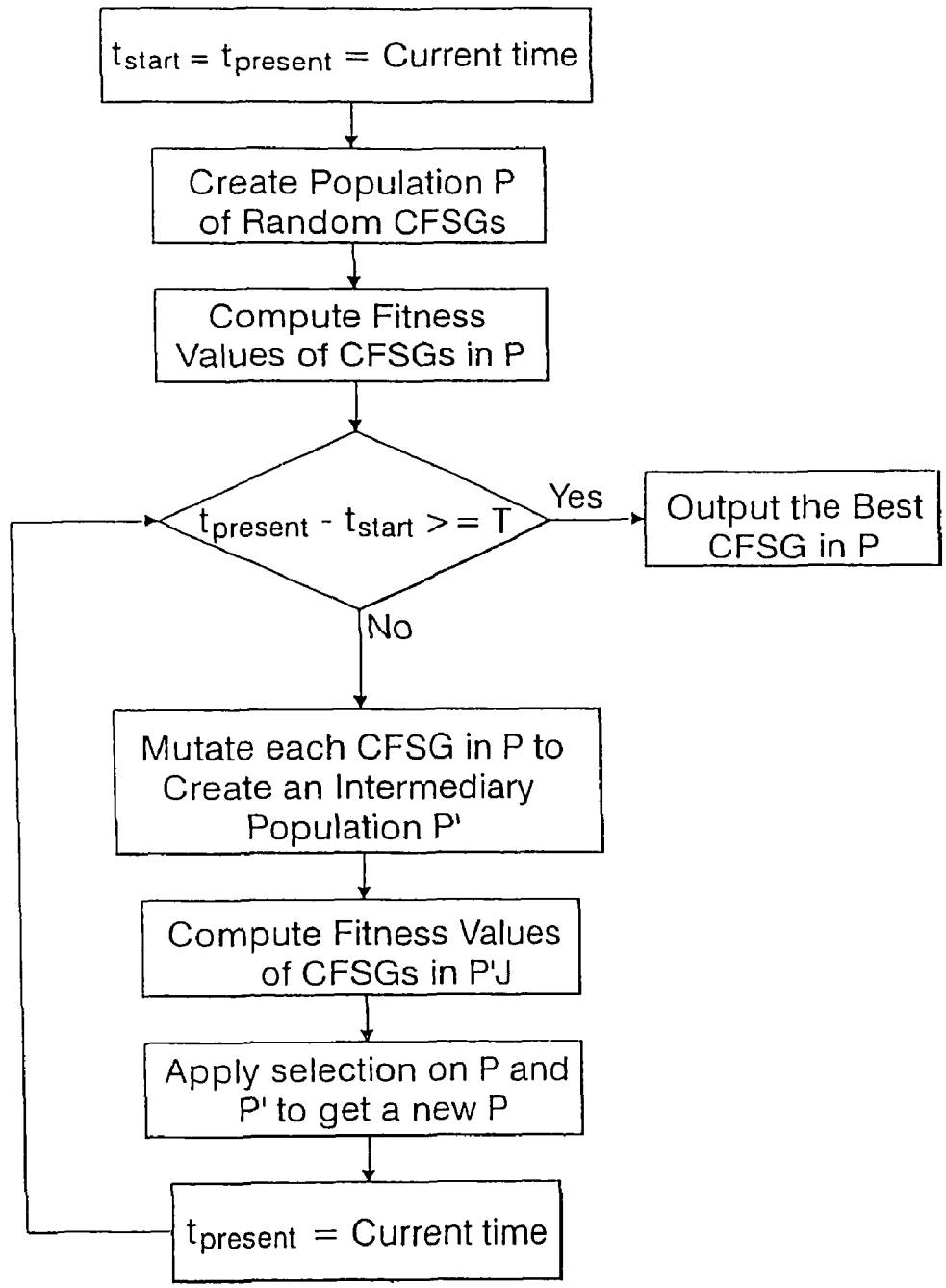
FIG. 9: Evolutionary algorithms based optimization technique.
Figure 14:
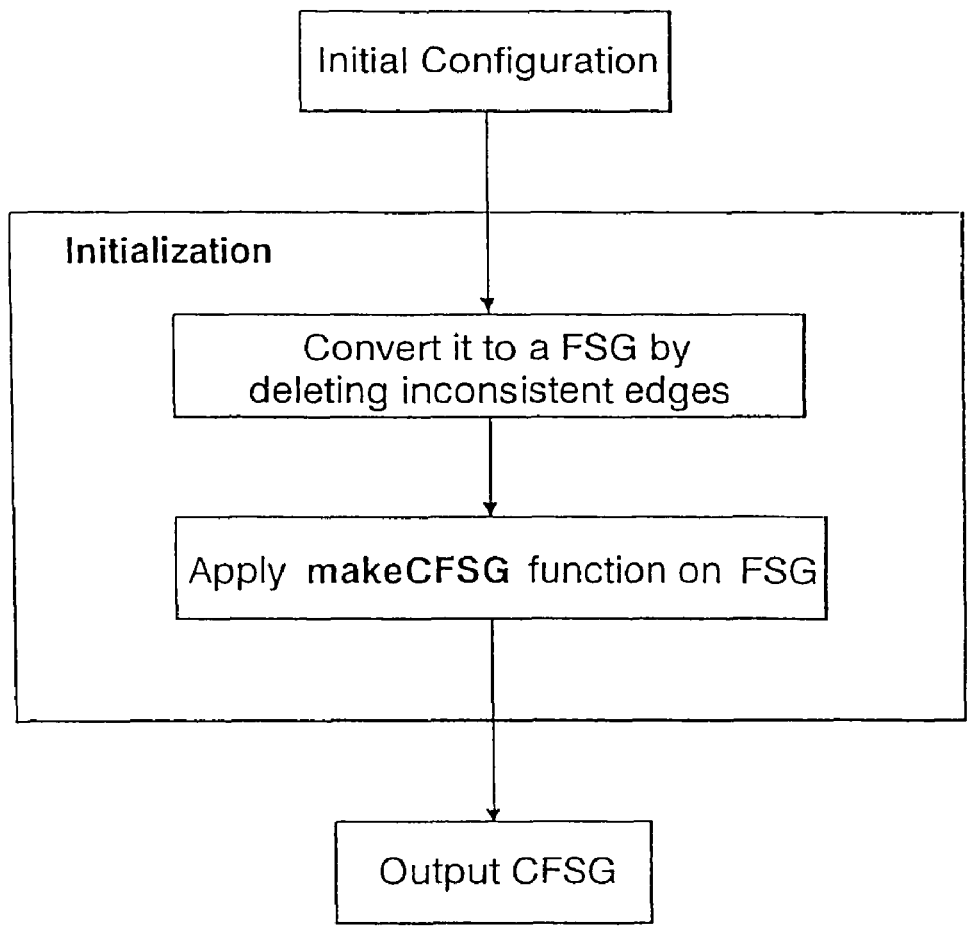
FIG. 14: Initialization scheme.

We describe below the optimization method and a specific embodiment of it. The proposed method is based on evolutionary algorithms and is shown in FIG. 9. Let P represent the set of N solutions in the population. The solutions in the population are represented as Complete Feasible Solution Graphs which are defined below. The method randomly initialized these N solutions as shown in FIG. 14 and computes various objective functions of the solutions. The solutions are mutated as FIG. 15 to create an intermediary population P'. The objective functions of these solutions are also computed. Then an appropriate selection operator is applied on P and P' to get a new population of solutions. The process of application of mutation operator, computation of objective functions and application of selection operator is repeated until the time of execution exceeds a predefined time limit. The method gives out the best solution in the population whenever the time limit is crossed. We explain the details of the method by describing the specific representation scheme used to represent solutions, the initialization scheme used to initialize the solution, the mutation and selection operators.

A solution is represented as a vector of solution resource objects. Each solution resource object contains a pointer to the resource that it represent, an array of pointers to the resources that it supports, an array of pointers to the resources that support the present resource and the location of the resource (see FIG. 10). We first define some notation which will be used in the description of various operators.

A Solution Graph (SG) is a directed graph where a vertex represents a resource or a service. An SG has only a subset of the edges from the original CG-SG contains an edge from resource $r_1$ to $r_2$ is allocated to $r_1$. A Feasible Solution Graph (FSG) is an SG in which the basic depend-on, equivalency, collocation, and capacity constraints specified in the CG are not violated. A Complete Feasible Solution Graph (CFSG) is an FSG in which no resource can be allocated (by inserting an edge) to any other resource without violating the basic constraints. That means, either the capacity of a supporting resource is exhausted or that the potentially dependent resources are supported by other services from an equivalency and thus, do not require the services of a supporting resource with unused capacity. Solutions are represented as a FSG and the operators make sure that they are CFSGs.

Figure 7:
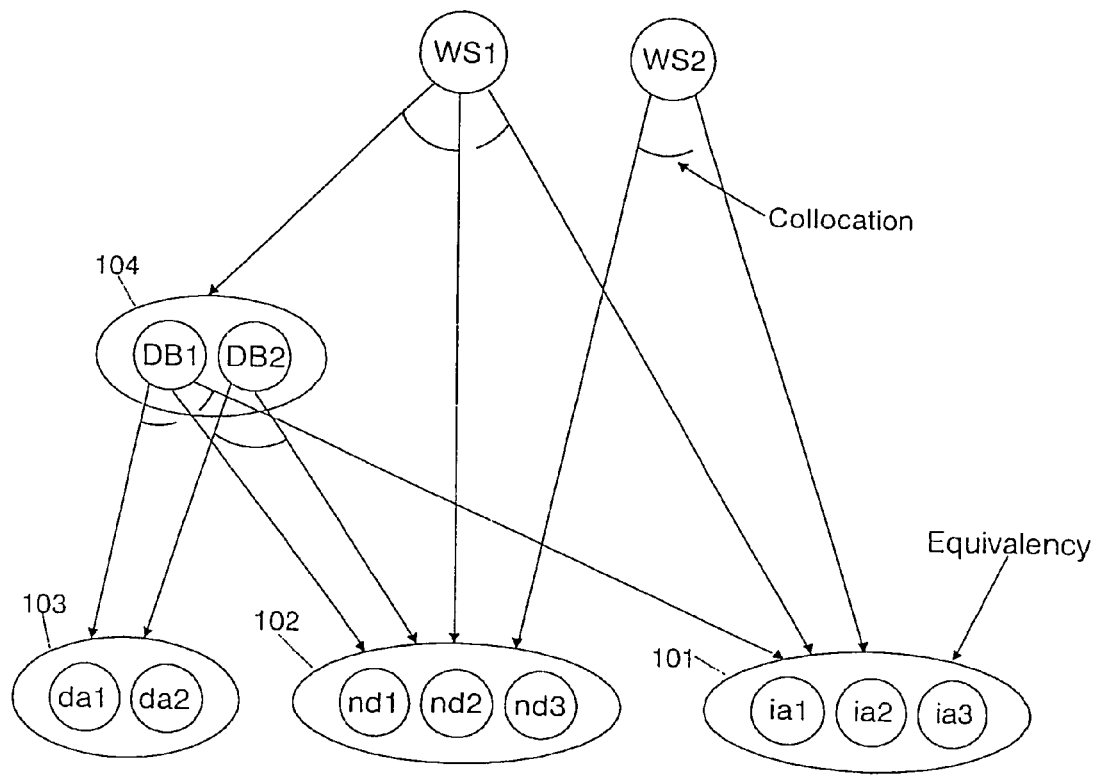
FIG. 7: Example—Graphical representation of a collection of resources with their dependencies and collocation constraints.
Figure 11:
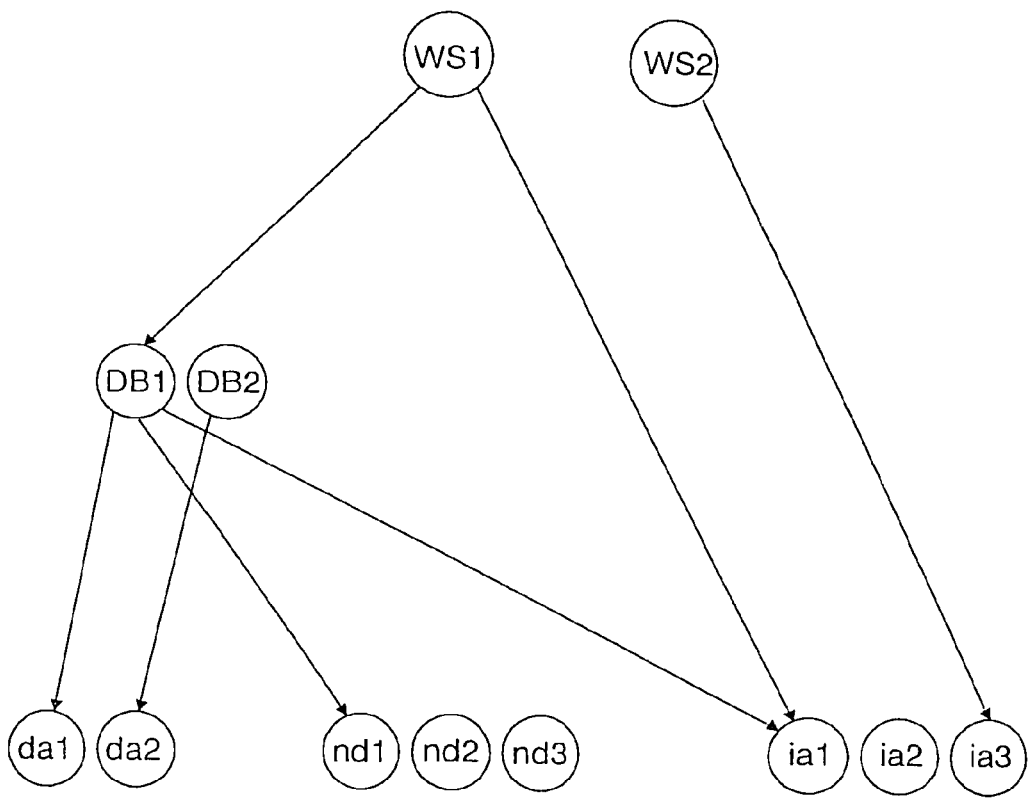
FIG. 11: A Feasible Solution Graph (FSG) of the example considered.
Figure 12:
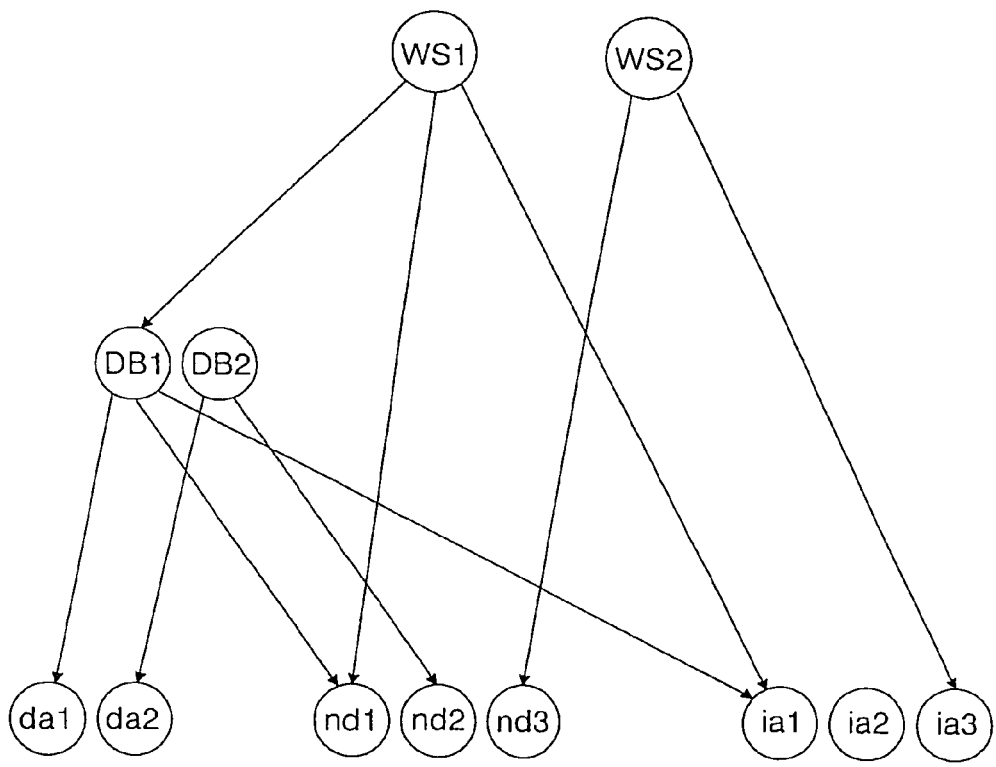
FIG. 12: A Complete Feasible Solution Graph (CFSG) of the example considered.
Figure 13:
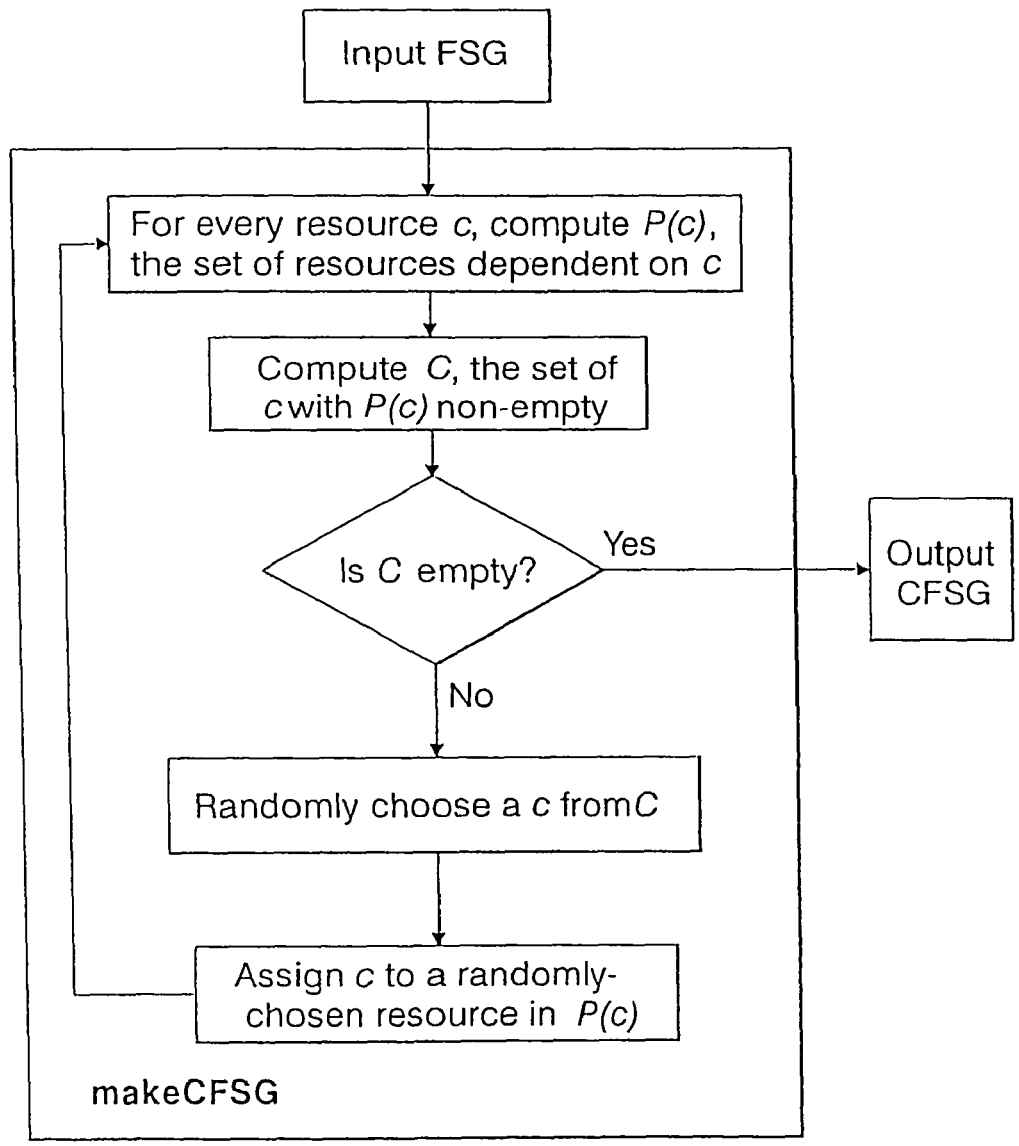
FIG. 13: makeCFSG function.

To make the above definitions clear, we consider an example shown in FIG. 7. Let us consider a collection of resources containing three ip-adapters (ia1, ia2 and ia3 on nodes 1, 2 and 3 respectively), three network disks (nd1, nd2 and nd3 on nodes 1, 2 and 3 respectively), two disk adapters (da1, and da2 on node 1 and 2 respectively), two database servers (DB1 and DB2) and 2 web servers (WS1, and WS2). each of ip-adapters and network disks can support only one dependent resource and has a preference of 0.2. The priorities of DB1, DB2, WS1 and WS2 are 0.85, 0.8, 0.6 and 0.7 respectively. All the ip-adapters form an equivalency 101, the network disks equivalency 102, disk adapters equivalency 103, and database servers equivalency 104. The equivalencies are represented by dashed ellipses in FIG. 7. DB1 should be supported by only one resource from each of equivalencies 101, 102 and 103. This is shown in the figure by edges from DB1 to the respective equivalencies. Moreover, all the supporting resources of DB1 should be at the same location. This collocation constraint is represented by a dashed arc on the corresponding edges in the figure. The other edges in the figure be interpreted appropriately. For this example, FIG. 11 and FIG. 12 show instances of FSD and CFSG respectively. Note that in FIG. 4 no constraint is violated. However, nd1 can be assigned to WS1, nd2 to DB2 and nd3 to WS2. After these assignments the FSG becomes CFSG as shown in FIG. 6. Also note that no resource in CFSG either can be allocated to other resources or need to be allocated to other resources.

The initialization scheme and the mutation operator use a function, call makeCFSG, that randomly generates a CFSG from a given FSG. The flowchart of the function is shown FIG. 7. Let P(c) be the set of resources that have a dependency on resource c and that each such dependency is yet to be satisfied. Let C be the set of resources with leftover capacity and non-empty P(c), c∈C. The method makeCFSG randomly chooses a resource c in C and allocates it to a resource randomly chosen from P(c) (by introducing a new edge). After every such assignment, makeCFSG reevaluates C. Note that the resource that can be brought up due to the last assignment may get added to C and a resource, whose capacity is exhausted, is removed from C. The method makeCFSG terminates when the set C is empty.

Figure 15:
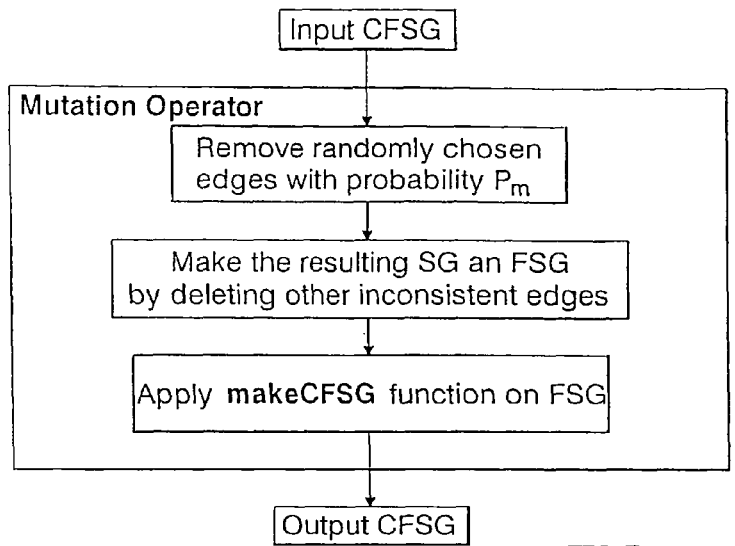
FIG. 15: Mutation operator.
Figure 16:
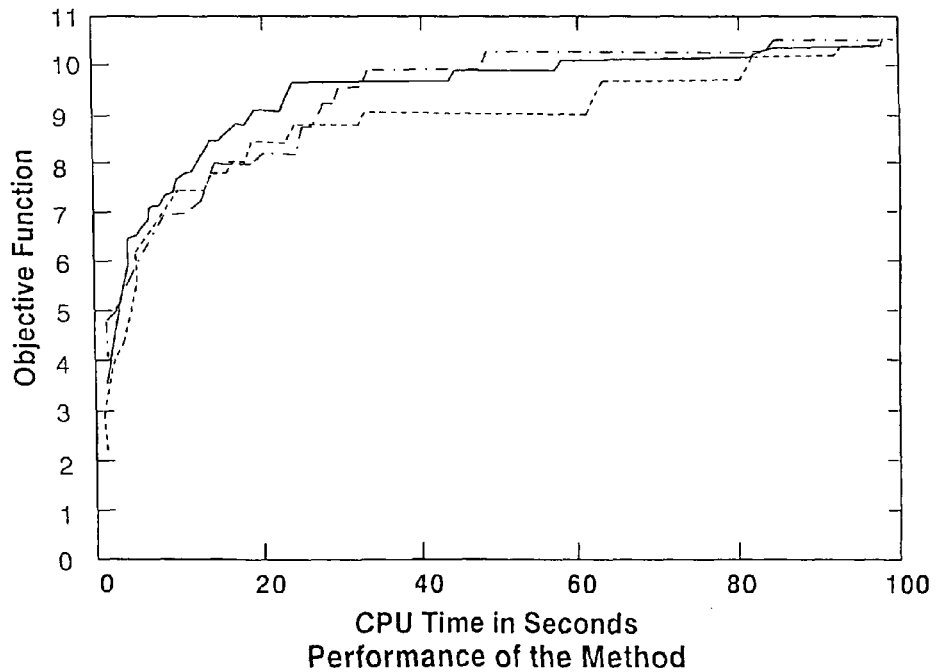
FIG. 16 shows the performance of an algorithm that may be used in the practice of this invention.

The solutions are initialized based on the initial configuration of the cluster. First the initial configuration is converted into an FSG by deleting inconsistent edges. Then, makeCFSG method is called to obtain a random CFSG. This is shown in FIG. 8. It may be noted that since makeCFSG randomly generates an CFSG, it can yield different CFSGs each time it is called. The mutation operator first randomly removes some edges from the solution with a small probability Pm, called Mutation Probablility. Mutation operator is shown in FIG. 15. Note that the edge removals may necessitate removal of some other edges to keep the solution in FSG. Mutation operator calls makeCFSG on this FSG to get a CFSG.

The basic aim of selection operator is to retain the promising solution in the population. There exist several heuristics that try to achieve this objective; each having their own merits and demerits. The promising nature of a solution is quantified based on the objective functions which is explained below. The rank based selection operator ranks each solution in the population and picks first N solutions for the new population. The stochastic tournament selection operator performs N comparisons between 2 randomly picked solutions from P and P' and retain the best among the two in the new population. In the considered resource allocation problem, there could be the following objectives: maximization of the sum of priorities of the resources that are brought on-line (denote it by function $f1$), maximization of the extent of equal distribution of load on the resources of similar type (denote it by $f2$), minimization of the cost incurred in reallocation (migration) of resource (denote it by $f3$). The objectives have their own importance in optimization. For example, the primary objective is to maximize $f1$, the secondary is to maximize $f2$, and the tertiary is to minimize $f3$. Let A and B be two configuration then, if $((f1(A)==f1(B))$ AND $(f2(A)==f2(B))$ AND $(f3(A)==f3(B))$ then A and B are equally good else if $(((f1(A)==f1(B))$ AND $(f2(A)==f2))$ AND $f3(A)<f3(B)))$ OR $((f1(A)==f1(B))$ AND $(F2(A)>f2(B)))$ OR $(f1(A)>f1(B)))$ then A is better than B else B is better than A.

Figure 10:
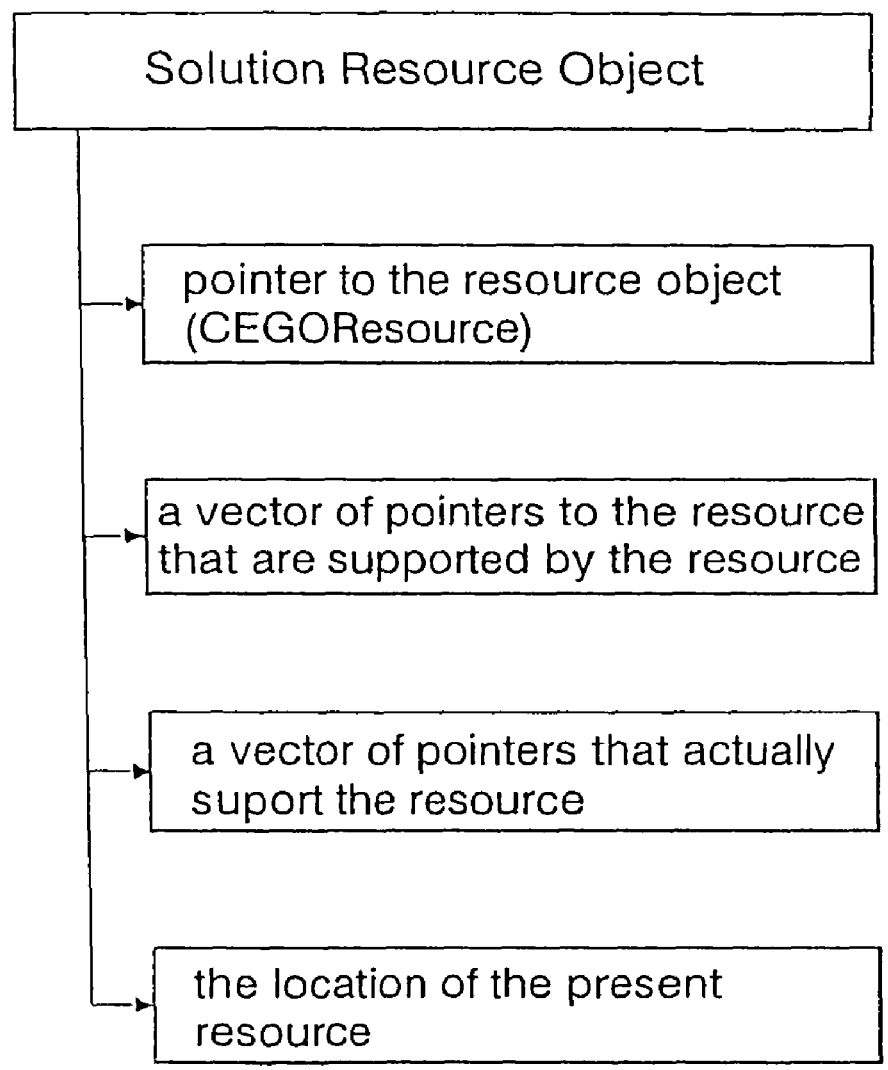
FIG. 10: Contents of Solution Resource Object.

In a specific embodiment of the method, we considered the maximization of $f1$. The method has been used to find optimal reallocations for various problems; a few real-life examples and various synthetic examples. The real-life examples consisted of small number of resources and constraints (between 10 to 20 resources distributed over up to 3 node locations). In all cases, the optimum solution was reached in less than 10 generations. Synthesized large examples consisting of 100 to 500 resources distributed over 10 to 30 nodes and an hierarchy of 3 to 5 layers of resources. FIG. 10 shows the performance of the algorithm (in terms of the CPU time used) for an example consisting of 300 resources distributed over 20 nodes and 3 layers. The population size was 100 and the mutation probability was set to 0.01. Shown in that figure are results from three different runs each with a unique initial seed for the random number generator. We observed similar trends with other examples.

The main features of the algorithm are (A) simplicity of approach, (B) amenable to soft real-time constraints, (C) ability to handle multiple objective functions, (D) can obtain a solution within a specified time; optimality depends on computational time, and (Against the) adaptive—can start from the current configuration and find an optimal one satisfying the modified constraints.

Described below is an approach for on-line modeling and solution of the global optimization using LP-based mathematical programming. These problems arise in the managing distributed resources using the apparatus described earlier.

This aspect of the invention relates to the problem of on-line management of distributed resources for providing reliable services in a clustering environment with externally specified business objectives.

BACKGROUND

A cluster is a highly flexible configuration that brings together a set of heterogeneous resources and provides users and system administrators a uniform, consistent, and single system view of these resources. Clusters address the user's requirements of high availability and reliability while providing the scalability and flexibility of configuration that is valuable to the system administrators. A typical cluster environment contains a variety of physical and computational resources. Theses resources can be as diverse processing elements, file systems, and databases. Relationships between resources can take many forms. A resource may depend on the services of another resource, provide a replacement for it, or compete with it for a third resource. By design, a cluster is supposed to provide a single point of control for cluster administrators and at the same time it is supposed to facilitate addition, removal, or replacement of individual resources without significantly affecting the services provided by the entire system. On one side, a cluster has a set of distributed, heterogeneous physical resources and, on the other side, it projects a seamless set of services that are supposed to have a look and feel (in terms of scheduling, fault tolerance, etc.) of services provided by a single large virtual resource. Obviously, this supplies some form of continuous coordination and mapping of the physical distributed resources and their services onto a set of virtual resources and their services. Typically, such coordination and mappings are handled by the resource management facilities. On-line management of the resources of a cluster involves allocating and re-allocating resources in the presence of complex-inter-relationships and competing requirements among resources and dynamic events such as failures, addition and deletion of resources, scheduled maintenance services, etc. In addition to the inter-resource dependencies and dynamic changes in their states, the clusters are to be configured and managed to achieve certain business objectives such as a maintaining certain quality-of-services, maintaining high availability of certain end-user services even in the presence of faults, graceful handling of failures, and so on.

In the following, we present a methodology for a deriving mathematical model of the cluster. Using that model, we obtain a solution to the on-line resource allocation problem using an innovative combination of well known mathematical optimization techniques. For this we first create abstractions that capture the inter-relationships among resource. Using these abstractions and the current state of the resources, we derive the mathematical model. The solution of the problem must be such that any allocation of resources must respect the constraints imposed by these relationships and conform with the given state of the system. An allocation must attempt to achieve several objectives: optimal availability of various prioritized service, good load balancing, and minimization of service disruptions and other costs of altering a configuration. These objectives have to be met continuously by on-line monitoring, formulating and solving the problem within a specified-time-window and in an event driven manner. The methodology presented here captures these constraints and objectives in the model and solution approach in such a way that it can be encoded in an apparatus for continuous on-line resource management.

Resources and Resource Relationships:

The term resource refers to any persistent hardware or software entity that uses and/or provides services available within the cluster. Examples of resources are nodes or processing elements, collection of nodes (i.e., servers), disks, memory, various adapters, networks, file systems, communication subsystems, data bases, web servers, various persistent system0level applications, etc. Every resource is associated with a fixed capacity: i.e., it may service only a fixed number of clients at a time. This also implies that a resource may be shared.

Typically, in a complex computing environment, hardware and software subsystems are built on the top of other components. The most basic components (such as the operating system of a node) bootstrap themselves. We refer to such resources as low-level resources. However, more advanced components rely on the availability of other services (for instance, a mounted files system may depend on the services provided by an IO-adapter). We refer to such resources as high-level resources. Top-level resources are those on which no other resources depend and typically these interact directly with end-users or other applications.

Figure 17:
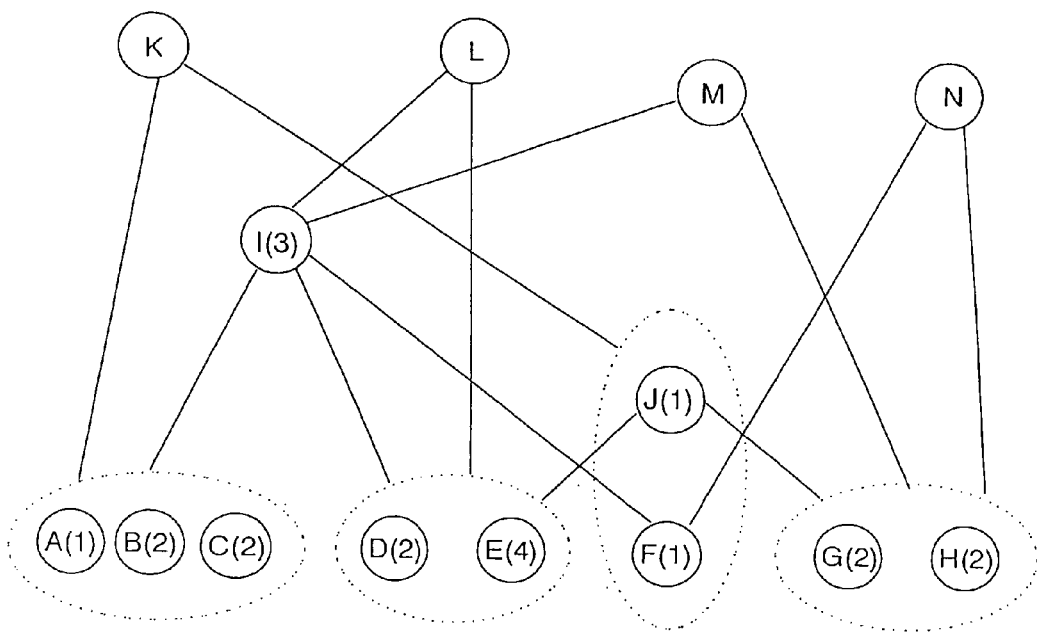
FIG. 17 illustrates a set of resources.

An illustrative set of resources is shown in FIG. 17. A, B, C, D, E, F, G and H are low-level resources. I, J, K, L, M and N are high-level resources. K, L, M and N are top-level resources. The capacities of various resources are shown in parentheses after the resource names.

We say that a resource R depends on a resource T, if R requires the services provided by T in order to be online. In some cases, it may be possible to meet such a requirement by using the services of any one of several resources. This flexibility is captures using an abstraction called an equivalency. An equivalency a set of resources that associates with each resource a positive real number called the weight of that resource. We say that resource R depends on equivalency. S, if R requires the services of one of the resources in S in order to be online. The policy associated with an equivalency is the vector of the weights of its resources. Policies are useful in ordering or prioritizing resources within an equivalency. In the example shown in FIG. 1, I depends on F, and on two equivalencies, one containing A, B, and C, and the other containing D and E.

There is a location associated with each resource. Some resources may have a pre-defined location, while others may have to be assigned a location. The process of allocation may encounter several kinds of location-related constraints, which arise from various inter-relationships between resources. We refer to such constraints as collocation constraints. A collocation constraint between resources A and B implies that A and B should be at the same location. If resource A depends on equivalency B, a collocation constraint on A and B implies that the location of A must be the same as that of the member of B which serves A. If resource A depends on equivalencies B and C, a collocation constraint on these two dependencies implies that the two resources allocated to serve A from B and C respectively must both have the same location.

In a typical cluster, there may be multiple top-level resources that may need to be brought up simultaneously. These resources may be competing for other resources and it may not be possible to support all of them simultaneously. With each resource is associated a number of referred to as the priority of that resource, which represents the relative importance of that resource. Each top-level resource is assigned a positive priority. A higher priority implies preference in bringing up that resource over another with a lower priority. Some other resources at other levels may have positive priorities assigned to them, if it is desirable to bring them online. Other resources have a priority of zero: such a resource is brought online only if doing so helps bring up a resource with positive priority.

SUMMARY

In this particular aspect of the invention, we propose a methodology by which resources can be allocated and re-allocated on-line to meet the complex and competing requirements and business objectives encountered in clustering environment; and various competing objectives can be combined and addressed in sophisticated manner. The approach comprises the following elements:

i. A scheme for representing the various constraints and objectives in the form of an integer linear program.

ii. Converting integer variables into fractional variables, which converts the integer linear program into a linear program; using standard mathematical programming tools and techniques to obtain a fractional optimal solution for the linear program.

iii. A scheme for obtaining an integer solution from the fractional optimal solution, wherein the conversion is done in several stages. At each stage, a suitable subset of variables are identified for which integer values are to be obtained, and the fractional values of those variables are replaced by integer values in such a way that the resulting solution is a valid solution for the linear program. Any variable in such a subset is never assigned a non-integer value in a subsequent subset.

iv. A scheme for performing the allocation of various resources based on the values for the various resources in the integer solution obtained in the previous step.

Integer Linear Program Formulation:

We formulate the problem of resource allocation as an integer linear program as follows. For every resource v, there is a 0-1 decision variable $z_v$ which takes the value 1 if and only if v is to be brought up. Let dep(v,i) represent the set of resources that can satisfy the $i^{th}$ dependency for resource v. For each resource u in dep(v,i), let $x_{v,u}$ be a decision variable indicating whether u is allocated to v, that is, whether v is served by u (here, we are assuming for simplicity of description that u does not occur in dep(v,i) for more that one i).

Then the requirements of v can be represented by the set of constraints $$\Sigma_{u \in dep(v,i)}(X_{v,u})=Z_v \text{ for all } i$$

For example, corresponding to resource I in FIG. 1 we have the constraint $$X_{I,A}+X_{I,B}+X_{I,C}=Z_I$$

Let $C_u$ denote the capacity of u. The capacity constraint for u can be represented by the following set of equations:

$$\Sigma_v(X_{v,u})=C_u \text{ for all } u \quad (1)$$

For resource A in our example this takes the form $$X_{K,A}+X_{I,A}=1 \quad (2)$$

We associate a 0-1 variable $l_{vj}$ with every resource v location j, indicating whether v is located at j (in case of resources whose locations are fixed these variables are replaced by constants). The following set of equations represents the requirement that a resource vv must have one unique location:

$$\Sigma_j(l_{u,j})=1 \text{ for all } u \quad (3)$$

Collocation of any two resources u and v can then be expressed by the constraints $$l_{u,j}=l_{v,j} \text{ for all } j \quad (4)$$

Consider a resource v choosing some resource out of the set dep(v,i). The variable $e_{v,i,j}$ indicates whether the chosen resource is located at location j.

Let there be k resources, 1, 2, ..., k in dep(v,i). The following constraints ensure that each variable $e_{v,i,j}$ takes the appropriate value:

$$e_{v,i,j} >= X_{i,m} + l_{m,j} - 1 \text{ for all } m=1, 2, \ldots, k \quad (5)$$

and $$\Sigma j\, e_{v,i,j} = z_v \text{ for all } v,i \quad (6)$$

Now the location of v can be made to depend on the choice made form the equivalency dep(v,i) by adding the following constraints:

$$l_{v,j} = e_{v,i,j} \text{ for all } j \quad (7)$$

For the example in FIG. 1, let us assume that there are three possible locations, Locations 1, 2, and 3. Also, assume that resource A, B and C are locations 1, 2 and 3 respectively. Now if we were to require that the location of resource K must depend on the choice made by K from the Equivalency {A, B, C}, then the following constraints would ensure such a selection:

$$e_{K,1,1} >= x_{1,A};\ e_{K,1,1} >= x_{1,B} - 1;\ e_{K,1,1} >= x_{1,C} - 1;$$

$$e_{K,1,2} >= x_{1,A} - 1;\ e_{K,1,2} >= x_{1,B};\ e_{K,1,2} >= x_{1,C} - 1;$$

$$e_{K,1,3} >= x_{1,A} - 1;\ e_{K,1,3} >= x_{1,B} - 1;\ e_{K,1,3} >= x_{1,C};$$

If the choices made from equivalencies dep(v,s) and dep(v, t) are needed to be collocated, the following constraints can be added:

$$e_{v,s,j} = e_{v,t,j} \text{ for all } j \quad (8)$$

For instance, if we require that the choice made by K from equivalency {A,B, C} must have the same location as the choice made by resource J from equivalency {G,H}. then we add the following constraints:

$$e_{K,1,1} = e_{J,2,1};\ e_{K,1,2} = e_{J,2,2};\ e_{K,1,3} = e_{J,2,3};$$

If resources u and v must be anti-collocated (located at different locations), then the following constraint is used:

$$l_{u,j} + l_{v,j} <= 1 \text{ for all } j \quad (9)$$

Thus, if K and M must be located at different locations, we require that $$l_{K,1} + l_{M,1} <= 1;\ l_{K,2} + l_{M,2} <= 1;\ l_{K,3} + 1_{M,3} <= 1;$$

In resource allocation, a primary objective is to maximize the sum of the priorities of resources that are brought online. Let $P_v$ represent the priority of resource v. The following objective function captures this objective:

$$O_1 = \Sigma_V P_V Z_V$$

Other objectives may be to distribute load across similar resources in a way that achieves load balance and conforms to policies associated with equivalences. These objectives are address as described below.

Let $L_v$ denote the total load on resource v. This is captured by the following constraints:

$$O_1 = \Sigma_v P_v Z_v$$

Other objectives may be to distribute load across similar resources in a way that achieves load balance and conforms to policies associated with equivalences. These objectives are addressed as described below.

Let $L_v$ denote the total load on resource v. This is captured by the following constraints:

$$\Sigma_u x_{u,v} = L_v \text{ for all } v \quad (10)$$

Let $U_v$ be the usage factor of resource v, determined by the constraints $$L_v = U_v \cdot C_v \text{ for all } v \quad (11)$$

We aim to achieve load balance by requiring that within any equivalency, the usage factors of all resources be as close to each other as possible. Let $B_i$ denote the balance in equivalency i, defined as $$B_i = \min_{v \in i} h_{i,v}(1 - U_v),$$

where $h_{i,v}$ denotes the weight of v in the policy associated with i.

The following linear constraints ensure that the variables $B_i$ take the desired values:

$$B_i <= h_{i,v}(1 - U_v) \text{ for all } v \in i \quad (12)$$

In our example, let {1, 4, 3} be the policy associated with Equivalency {A, B, C}, which we will refer to as Equivalency 1. Then we have the constraints $$B_1 <= 1 - U_A;\ B_1 <= 4(1 - U_B);\ B_1 <= 3(1 - U_C);$$

We seek to optimize the values $B_i$ in order to achieve the objective of load balances in conformance with priority policies. We represent this objective of optimizing load balance as $$O_2 = \Sigma_i B_i,$$

where the summation is over all equivalencies i.

The presence of the $h_{i,v}$ term in Equation 12 serves to relax load balance requirements—a more favoured resource may thus be loaded more than other resources. Lastly, our objective of minimizing the deviation from an existing solution may be represented by the objective function $$O_3 = \Sigma_{all(u,v)} |x_{u,v} - y_{u,v}|,$$

where $y_{u,v}$ represents the value of $x_{u,v}$ in the existing allocation.

We combine the three objectives into one objective function simply as maximize $O_1 + k_1\, O_2 + k_2\, O_3$
subject to constraints (1-12)

The constants $k_1$ and $k_2$ can be selected to be small enough so that the objectives represented by $O_2$ and $O_3$ are strictly secondary and the above ILP optimizes $O_1$.

Obtaining an Integer Solution from the Optimal Fractional Solution

Figure 18:
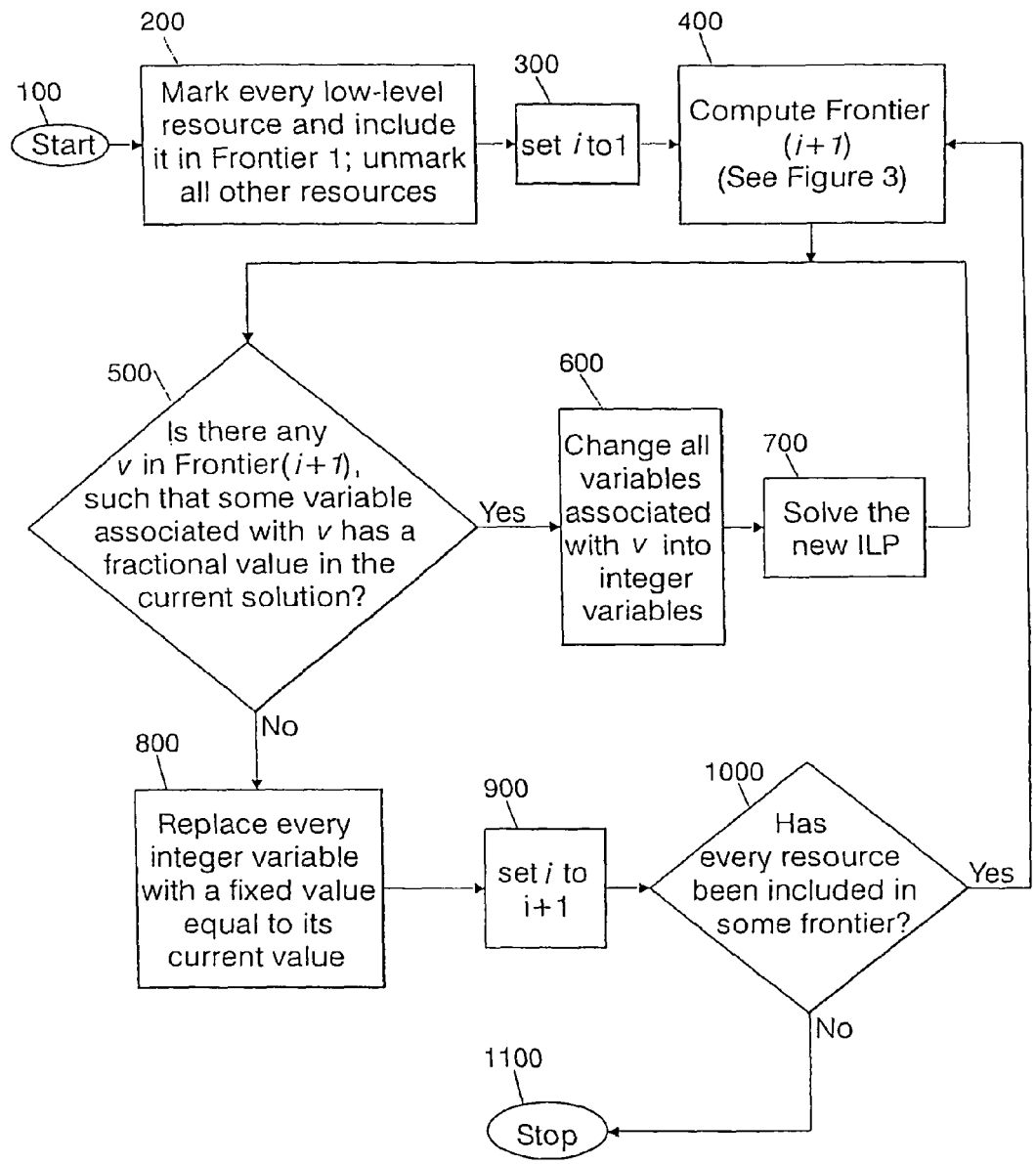
FIG. 18 outlines an approach for connecting fractional solution to integer solution.
Figure 19:
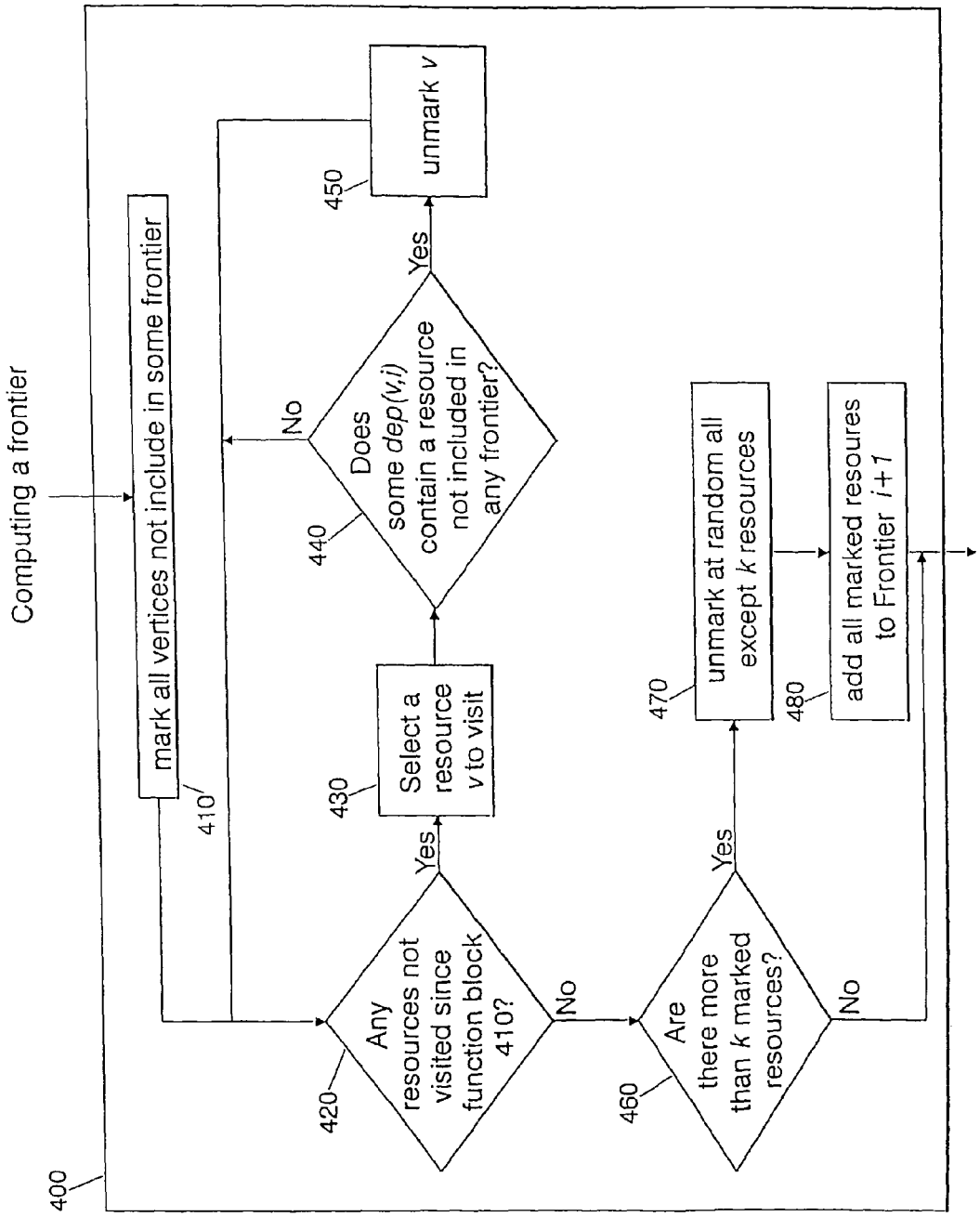
FIG. 19 illustrates a procedure for computing a frontier.

In brief, we obtain an integer solution by solving a linear relaxation of the ILP described above, and then heuristically converting the optimal factional solution to obtain an integer solution. Having obtained an optimal fractional solution, we convert it into an integer solution in stages, at each stage "fixing" the values of variables that have been rounded in previous stages. We tackle lower-level resource before those that depend on them. In every iteration, we identify a few resources and their associated variables. We apply the integrality constraint for those variables to obtain an ILP with a relatively small number of integrality constraints. We solve this ILP, extract the values of the selected variables from the solution, and fix those values for their respective variables for all subsequent iterations. We continue this process till we arrive at a fully integral solution. An outline of our approach is presented in FIG. 17. FIG. 18 illustrates in detail the computation step represented by function block 400 in FIG. 17.

Allocation of Resources Based on the Integer Solution

Having obtained an integer solution, we perform resource allocation in a straightforward manner. For every variable $Z_v$ whose value is 1, the corresponding resource v is brought up. This is done by allocating resource u to resource v whenever for all u and v such that the value of $X_{v,u}$ is 1. Similarly, for all v and j such that $L_{v,j}$ is 1, resource v. is assigned location j.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true sprit and scope of the present invention.

The invention claimed is:

1. A method of using an object repository to mirror events in a cluster of resources, the object repository including objects, each of the objects representing one of the resources in the cluster of resources, and each of the objects including a plurality of fields holding data indicating states and dependencies of the resources represented by said each object, said plurality of fields including a dependent resource field, the method comprising:
   when defined events occur in the cluster of resources, updating the object repository with the events, wherein the object repository mirrors said cluster and provides a summary of the cluster to enable viewing the cluster and determining a global solution for allocating the resources of the cluster, including
   when one of the resources in the cluster becomes unavailable, removing the one object representing said one of the resources, from the dependent resource fields of the others of the objects representing resources on which said one of the resources was dependent; and
   using one or more processing units to perform the recording.

2. A system for using an object repository to mirror events in a cluster of resources, the object repository including objects, each of the objects representing one of the resources in the cluster of resources, and each of the objects including a plurality of fields holding data indicating states and dependencies of the resources represented by said each object, said plurality of fields including a dependent resource field, the system comprising:
   one or more processing units configured for:
   when defined events occur in the cluster of resources, updating the object repository with the events, wherein the object repository mirrors said cluster and provides a summary of the cluster to enable viewing the cluster and determining a global solution for allocating the resources of the cluster, including
   when one of the resources in the cluster becomes unavailable, removing the one object representing said one of the resources, from the dependent resources fields of the others of the objects representing resources on which said one of the resources was dependent.

3. A program storage device readable by a computer, tangibly embodying a program of instructions executable by the computer for using an object repository to mirror events in a cluster of resources, the object repository including objects, each of the objects representing one of the resources in the cluster of resources, and each of the objects including a plurality of fields holding data indicating states and dependencies of the resources represented by said each object, said plurality of fields including a dependent resource field said program of instructions, when executing in the computer, performing the following:
   when defined events occur in the cluster of resources, updating the object repository with the events, wherein the object repository mirrors said cluster and provides a summary of the cluster to enable viewing the cluster and determining a global solution for allocating the resources of the cluster, including
   when one of the resources in the cluster becomes unavailable, removing the one object representing said one of the resources, from the dependent resource fields of the others of the objects representing resources on which said one of the resources was dependent.

* * * * *